US012519239B1

(12) United States Patent
Alwan et al.

(10) Patent No.: US 12,519,239 B1
(45) Date of Patent: Jan. 6, 2026

(54) PENTA-BAND APERTURE SHARED ANTENNA AND METHODS OF FABRICATING THE SAME

(71) Applicants: Elias Antoun Alwan, Miami, FL (US); Md Nazim Uddin, Miami, FL (US)

(72) Inventors: Elias Antoun Alwan, Miami, FL (US); Md Nazim Uddin, Miami, FL (US)

(73) Assignee: The Florida International University Board of Trustees, Miami, FL (US)

(*) Notice: Subject to any disclaimer, the term of this patent is extended or adjusted under 35 U.S.C. 154(b) by 0 days.

(21) Appl. No.: 19/207,031

(22) Filed: May 13, 2025

(51) Int. Cl.
*H01Q 9/04* (2006.01)
*H01Q 15/00* (2006.01)
*H01Q 21/30* (2006.01)

(52) U.S. Cl.
CPC ........... *H01Q 9/0428* (2013.01); *H01Q 9/045* (2013.01); *H01Q 15/006* (2013.01); *H01Q 21/30* (2013.01)

(58) Field of Classification Search
CPC .... H01Q 9/0428; H01Q 9/045; H01Q 15/006; H01Q 21/30
See application file for complete search history.

(56) References Cited

FOREIGN PATENT DOCUMENTS

KR 102095943 B1 * 4/2020 ............. H01Q 9/065

OTHER PUBLICATIONS

Uddin, M.N., Alwan, E.A. A shared-aperture pentaband antenna with high impedance surface for CubeSat application. Sci Rep 14, 16146 (2024). https://doi.org/10.1038/s41598-024-66632-7. pp. 1-12, Published Jul. 12, 2024 (Year: 2024).*

Kabir, S.S.; Khan, M.H.; Latif, S.I. A Multi-Band Circularly Polarized-Shared Aperture Antenna for Space Applications at S and X Bands. Electronics 2023, 12, 4439 (Year: 2023).*

* cited by examiner

*Primary Examiner* — Dieu Hien T Duong
(74) *Attorney, Agent, or Firm* — SALIWANCHIK, LLOYD & EISENSCHENK

(57) ABSTRACT

A circular polarized penta-band antenna device and a method for fabricating the antenna device are provided. The antenna device includes: a substrate; a primary L-band antenna formed on the substrate; and a plurality of secondary antennas formed on a top surface of the L-band antenna. The plurality of secondary antennas includes: an X-band antenna; a K-band1 antenna; a K-band2 antenna; and a Ka-band antenna. Each of the X-band, K-band1, K-band2, and Ka-band antennas has a corner-truncated patch structure configured to generate left-hand circular polarization (LHCP). Each of the antennas operates simultaneously to enable multi-band communication and a shared aperture is formed across all antennas.

20 Claims, 29 Drawing Sheets

PENTA-BAND APERTURE SHARED ANTENNA AND METHODS OF FABRICATING THE SAME

GOVERNMENT SUPPORT

This invention was made with government support under 2030250 awarded by the National Science Foundation. The government has certain rights in the invention.

BACKGROUND

In recent years, CubeSats have revolutionized satellite communication, due to their low cost, light weight, and ease of deployment, making them ideal for various applications, including remote sensing, navigation, and deep space scientific explorations, among others.

Generally, the size of CubeSat is defined by a multiple of 1 cubic unit (1 U). Notably, 1 U corresponds to L×W×H=10 cm×10 cm×10 cm. Due to its size restriction, CubeSat face inherent limitations of payload capacity, accommodating only small instruments or experiments weighing a few kilograms or even grams depending on the satellite's size.

CubeSat radios typically require low size, weight, and power (SWaP). As such, antennas and radio frequency (RF) front ends must be very compact and lightweight for the designated frequency band, which is challenging to achieve. Several lightweight, low profile and compact antennas are designed for the CubeSat applications. However, antennas with different frequency bands are needed to communicate with ground station and global positioning and sensing. For example, UHF and L band antennas are reliable due to their low atmospheric absorption to establish initial communication with the ground station. However, these low frequency band antennas are unsuitable for faster communication with high data rates. Nowadays, satellite and deep space communications require operating at high frequencies (for example, X-band, K-band, and Ka-band) that support larger bandwidth, improved signal penetration, smaller antenna size, lower levels of interference, and higher data rates.

Wideband and ultra-wideband (UWB) antenna technologies have become prominent solutions to harness more of the available bandwidth, especially for cellular applications. Among different types of UWB antenna configurations, a balanced antipodal Vivaldi antenna (BAVA) or tightly coupled dipole antenna (TCDA) is well-known for ultra-wideband operation. However, their gain is often not constant, and their efficiency is comparatively low, taking many significant dips throughout the entire band. Alternatively, higher efficiency can be achieved using aperture-shared antennas that comprise integrating different band antennas onto a single substrate. This aperture-shared concept, also known as aperture-in-aperture (AIA), allows the optimization of the gain at each band separately. Compared to UWB antennas, much higher aperture efficiency can be achieved using the AIA design. Further, AIA enables the creation of multiple spatial channels, improving the system's data rates.

Aperture-In-Aperture Design

The field of CubeSat-based satellite communication is largely driven by the significant size disparity between these miniature satellites and the wavelengths of radio frequencies they employ. Given the size constraints, designing antennas that are both compact and lightweight-yet still operate effectively within the designated frequency band-poses a considerable challenge.

Several lightweight, low-profile, and compact antennas have been developed for the CubeSat applications. However, antennas with different frequency bands are required to support communication with ground stations, as well as global positioning and sensing functions. For example, UHF and L-band antennas are particularly reliable for establishing initial communication with the ground stations due to their low atmospheric absorption.

However, these low-frequency band antennas are not suitable for high-speed communication with high data rates. Modern satellite and deep space communications require higher bands, such as X-band, K-band, and Ka-band, due to their wider bandwidth, improved signal penetration, smaller antenna size, lower levels of interference, and higher data rates. Given the size and power constraints of CubeSat, the antenna design needs careful optimization, leading to the exploration of integrating different band antennas into a single substrate, resulting in the development of aperture-in-aperture (AIA) antenna architectures.

Recently, aperture-shared antennas have received extensive attention within the antenna research community. The most essential characteristics of an AIA antenna include frequency ratio, isolation, and aperture reuse efficiency. Various design methodologies have been proposed to design aperture-shared antennas.

One approach involves alternately placing the antenna elements and using different feeding positions. However, this antenna design suffers from a narrow impedance bandwidth (for example, less than 10%) and low aperture reuse efficiency.

In a second method, stacked method, a higher-band antenna is placed on top of a lower-band antenna, effectively enhancing aperture reuse efficiency. For example, a dual-band shared micro-strip and Fabry-Ferot resonator antenna is designed to operate at 0.9 GHz and 5.4 GHz, achieving a maximum frequency ratio of 6.4. An even larger frequency ratio of 17 has been demonstrated using a shared patch antenna combined with a substrate-in-waveguide (SIW) slot antenna operating at 3.5 GHz and 60 GHz. Additionally, a dual-polarized dual-band shared patch antenna is presented to operate in X-band and Ka-band, maximizing aperture share efficiency. However, because the higher-band port is pierced through the lower-band antenna, the isolation among the different bands is poor for the stack-based aperture-shared antennas.

A third approach involves inserting a higher-band antenna into a lower-band antenna, offering a better solution for an optimized trade-off between isolation and aperture reuse efficiency. For instance, a tri-band antenna designed for X-band, Ka-band, and Ku-band achieves a maximum frequency ratio of only 3.6. However, this antenna design requires multiple stacked substrates with an aperture coupled feeding from a different layer of the stack, resulting in a highly complex structure.

While extensive research has been conducted on the dual-band antennas, there are relatively few studies focusing on tri-band aperture shared antennas. Reports on penta-band antennas with high-frequency ratios are even more limited. Designing aperture-shared penta-band antennas on a single substrate with uniform thickness is particularly complex and time-consuming, especially when additional design parameters such as polarization diversity and high gain are also considered.

BRIEF SUMMARY

Embodiments of the subject invention provide penta-band aperture shared antenna devices and methods for fabricating the antenna devices.

According to an embodiment of the subject invention, a circular polarized penta-band antenna device is provided. The device comprises a substrate; a primary L-band antenna formed on the substrate; a plurality of secondary antennas formed on a top surface of the L-band antenna, the plurality of secondary antennas comprising an X-band antenna; a K-band1 antenna; a K-band2 antenna; a Ka-band antenna; wherein each of the X-band, K-band1, K-band2, and Ka-band antennas has a corner-truncated patch structure configured to generate left-hand circular polarization (LHCP), wherein each of the antennas operates simultaneously to enable multi-band communication, and wherein a shared aperture is formed across all antennas. The L-band antenna can be configured to operate in a range of from 1.49 GHz to 1.51 GHz (e.g., 1.5 GHz or about 1.5 GHZ). The X-band antenna can be configured to operate in a range of from 12.3 GHz to 12.8 GHz (e.g., 12.5 GHz or about 12.5 GHZ). The K-band1 antenna can be configured to operate in a range of from 18.1 GHz to 20.1 GHZ (e.g., 18.5 GHz or about 18.5 GHZ). The K-band2 antenna can be configured to operate in a range of from 24.7 GHz to 28.1 GHZ (e.g., 26 GHz or about 26 GHz). The Ka-band antenna can be configured to operate in a range of from 29 GHz to 34 GHZ (e.g., 32 GHz or about 32 GHz).

Moreover, the plurality of secondary antennas are integrated into the L-band antenna through etched slots of the L-band antenna. The etched slots of the L-band antenna are square-shaped to accommodate the secondary antennas and the etched slot for the Ka-band has dimensions of approximately 14 mm×14 mm. The Ka-band antenna further comprises a high impedance surface (HIS) integrated around the patch structures to mitigate surface wave interference and reduce radiation pattern distortions. Furthermore, the substrate is made of a material having a relative permittivity (εr) of approximately 2.2, a loss tangent (tanδ) of approximately 0.009, and a thickness of approximately 0.79 mm. The L-band antenna has a dimension of approximately 5.5 cm×5.5 cm and includes two orthogonal feeds for achieving circular polarization. Each of the X-band, K-band1, K-band2, and Ka-band antennas is provided with a dedicated ground plane separated by a gap from a ground plane of the L-band antenna. In addition, the antenna device is configured to achieve an inter-band isolation greater than 35 dB. Each of the ground planes of the secondary antennas is spaced apart from by a distance of approximately 2 mm. The L-band antenna is configured to achieve a realized gain of approximately 5.05 dBi in both the E-plane and H-plane when operating at approximately 1.5 GHz. The X-band antenna is configured to achieve a realized gain of approximately 7.8 dBi when operating at approximately 12.5 GHz. The K-band1 antenna is configured to achieve a realized gain of approximately 7.1 dBi when operating at approximately 18.5 GHz. The K-band2 antenna is configured to achieve a realized gain of approximately 7.97 dBi when operating at approximately 26 GHz. The Ka-band antenna is configured to achieve a realized gain of approximately 9.97 dBi when operating at approximately 32 GHz. The antenna device is configured to achieve a circular polarization bandwidth of less than 3 dB. The antenna device is configured to integrate into form factors of a CubeSat without deployable structures.

In another embodiment of the subject invention, a circularly polarized penta-band antenna device for CubeSat applications is provided. The device comprises a primary L-band antenna configured to operate at approximately 1.5 GHZ, the L-band antenna formed on a planar substrate; four etched slots disposed symmetrically within the L-band antenna to form quad-gaps; four patch antennas respectively configured to operate at X-band frequency of approximately 12 GHz, K-band frequency of approximately 18.5 GHZ, K-band2 frequency of approximately 26 GHZ, and Ka-band frequency of approximately 32 GHZ), the four patch antennas being embedded in the quad-gaps of the L-band antenna; and a high-impedance surface (HIS) formed with the Ka-band antenna and configured to mitigate surface wave interference and suppress ripples in the radiation patterns; wherein each of the X-band, K-band1, K-band2, and Ka-band antennas is formed with a corner-truncated patch configured to generate left-hand circular polarization (LHCP), wherein the L-band antenna includes two orthogonal feed positions configured to enable switching between linear polarization and circular polarization, and wherein each of the X, K, and Ka-band antennas comprises a separate ground plane spaced apart from a ground plane of the L-band antenna. The HIS comprises a 2D periodic structure of square metal patches connected via a plurality of vias to the ground plane of the Ka-band antenna to mitigate surface wave interference and suppress ripples in the radiation patterns. Moreover, the HIS is configured to have inductance and capacitance to resonate at approximately 32 GHz, thereby suppressing surface wave propagation.

In certain embodiments of the subject invention, a method of fabricating a circular polarized penta-band antenna device is provided. The method comprises providing a substrate; fabricating a primary L-band antenna with dimensions configured to operate at approximately 1.5 GHz; etching four symmetrical slots into the L-band antenna to define quad-gaps; inserting four patch antennas into the four quad-gaps, respectively, each patch antenna being configured to operate at a respective band of X, K1, K2, and Ka; forming each patch antenna with a corner-truncated geometry to achieve left-hand circular polarization; providing a separate ground plane for each patch antenna by etching copper beneath each corresponding slot region; and assembling and connecting each antenna feed, wherein the L-band antenna includes dual orthogonal feeds and each of the X, K1, K2, and Ka antennas includes a single feed. The substrate is made of a material having a relative permittivity (er) of approximately 2.2, a loss tangent (tanδ) of approximately 0.009, and a thickness of approximately 0.79 mm. The method may further comprise integrating a high-impedance surface (HIS) adjacent to the Ka-band patch antenna to suppress surface wave propagation and smooth the radiation pattern. The HIS is formed with a mushroom-type structure with top patches and a plurality of metal vias, being equivalent to a lumped LC circuit resonant at approximately 32 GHz. In addition, the fabricated antenna is validated through full-wave simulation and measurement of realized gain and axial ratio across the five bands including L, X, K1, K2, and Ka.

DETAILED DESCRIPTION

TABLE 1

Figure 1:
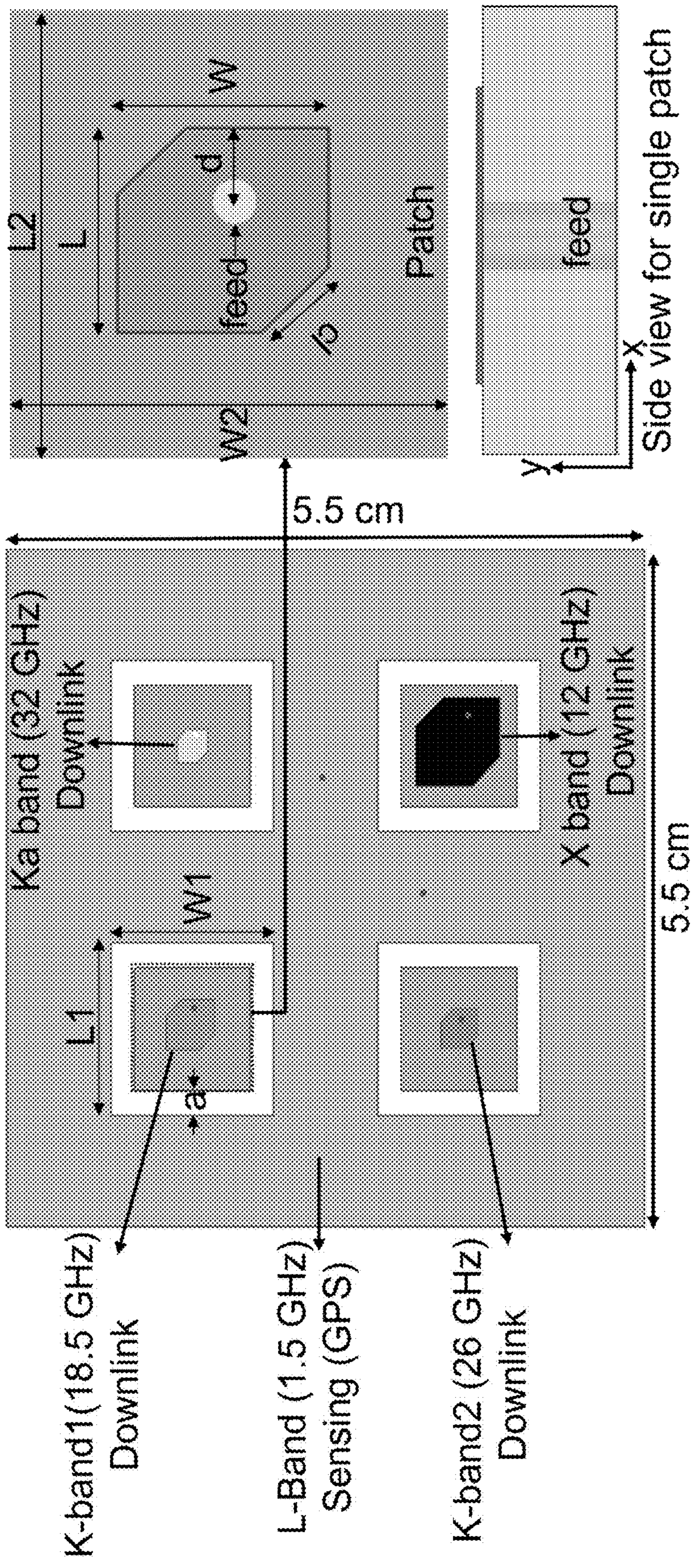
FIG. 1 shows the top view of an aperture-shared penta-band antenna device and a side view for a single patch of the antenna, according to an embodiment of the subject invention.

Optimized parameters of the pentaband antenna.

| Antenna | L (mm) | W (mm) | cl (mm) | d (mm) |
|---|---|---|---|---|
| X-band (12 GHz) | 7.26 | 7.26 | 2.34 | 1.54 |
| K-band1 (18.5 GHz) | 4.85 | 4.85 | 1.55 | 1.02 |
| K-band2 (26 GHz) | 3.38 | 3.38 | 1.09 | 0.715 |
| Ka-band (32 GHz) | 3 | 3 | 1.1 | 0.62 |

TABLE 2

Performance comparison of our antenna with previously reported aperture shared antenna. Thickness (λ) is represented according to the wavelength of the lower band; Frequency Ratio = High band/Low band.

| References | Aperture type | Frequency (GHz), low/high | Gain (dBi) | Max. Isolation (dB) | Thickness (λ) | Frequency Ratio | Polarization |
|---|---|---|---|---|---|---|---|
| 18 | Stacked | 0.9/5.8 | 5.8 | 20 | 0.075 | 6.4 | Circular |
| 38 | Stacked | 0.9/2.45 | 5.8 | — | 0.026 | 2.7 | Circular |
| 39 | Stacked | 0.35/2.1 | 7.89 | 20 | 0.234 | 6 | Circular |

TABLE 2-continued

Performance comparison of our antenna with previously reported aperture shared antenna. Thickness (λ) is represented according to the wavelength of the lower band; Frequency Ratio = High band/Low band.

| References | Aperture type | Frequency (GHz), low/high | Gain (dBi) | Max. Isolation (dB) | Thickness (λ) | Frequency Ratio | Polarization |
|---|---|---|---|---|---|---|---|
| 40 | Insertion | 1.55/29 | 4-10 | 20 | 0.32 | 18.7 | Circular |
| 37 | Insertion | 2.013/8.53 | 7.7-12.8 | 20 | 0.137 | 4.23 | Circular |
| Our De-sign | Insertion | 1.5/32 | 5-8.56 | 35 | 0.003 | 21.3 | Circular |

Embodiments of the subject invention are directed to a circular polarized penta-band antenna device and a method for fabricating the antenna device.

According to the embodiments of the subject invention, a circular polarized (CP) penta-band antenna device based on the aperture-in-aperture (AIA) design is provided, offering a compact and efficient solution for CubeSat applications. The penta-band antenna device comprises antennas of five different bands including L-band, X-band, K-band1, K-band2, and Ka-band. Four antennas, namely, X-band, K-band1, K-band2, and Ka-band that respectively operate at approximately 12 GHz, approximately 18.5 GHZ, approximately 26 GHz, and approximately 32 GHz, are integrated into a primary L-band antenna operating at approximately 1.5 GHz. Notably, all five antennas can be configured to operate simultaneously, enabling efficient multi-band downlink communications for CubeSats applications. Further, four square-shaped slots are etched into the L-band antenna formed on a substrate, to respectively accommodate the X-band, K-band1, K-band2, and Ka-band antennas that operate at four different frequency bands. The L-band antenna can be configured to operate in a range of from 1.49 GHz to 1.51 GHz (e.g., 1.5 GHz or about 1.5 GHZ). The X-band antenna can be configured to operate in a range of from 12.3 GHz to 12.8 GHz (e.g., 12.5 GHz or about 12.5 GHz). The K-band1 antenna can be configured to operate in a range of from 18.1 GHz to 20.1 GHz (e.g., 18.5 GHz or about 18.5 GHZ). The K-band2 antenna can be configured to operate in a range of from 24.7 GHz to 28.1 GHZ (e.g., 26 GHz or about 26 GHz). The Ka-band antenna can be configured to operate in a range of from 29 GHz to 34 GHz (e.g., 32 GHz or about 32 GHz).

In one embodiment, a ratio between the maximum frequency and the minimum frequency for the shared aperture is around 21.3. The antenna device shows a realized gain of 5-10 dBic with good CP bandwidth (for example, <3 dB) for the operational frequency range. The realized gain of L-band, X-band, K-band1, and K-band2 are 5.05 dBi, 7.8 dBi, 7.1 dBi, and 7.97 dBi when operating at 1.5 GHZ, 12.5 GHZ, 18.5 GHZ, and 26 GHz, respectively.

However, the realized gain of the Ka-band antenna is 9.97 dBi at 32 GHz, showing ripples due to the surface waves. Thus, a high impedance surface (HIS) is integrated with the Ka-band antenna to mitigate the ripples in the radiation pattern produced by the interference of the surface waves.

A prototype of the penta-band antenna device is fabricated and tested to validate the full-wave simulation results. The measurement data shows good agreement with the simulation results, confirming that the penta-band antenna device is a great candidate for the multi-frequency CubeSat operations.

According to the embodiments of the subject invention, the penta-band antenna device offers at least the following advantages:

1. integrating L-band, X-band, K-band1, K-band2 and Ka-band antennas in the single aperture based on a same substrate;
2. reducing the surface waves for the L-band, X-band, and Ka-band while enhancing the isolation between the bands (for example, >35 dB), achieved by a separate ground plane for each antenna;
3. demonstrating a high-frequency ratio (for example, >21);
4. integrating HIS for the Ka-band operating at 32 GHZ, thereby reducing the ripples in the radiation pattern to generate a smooth pattern; and
5. providing low power consumption and smaller size for the aperture, making it an excellent option for the CubeSat applications.

Referring to FIG. 1, the aperture-shared penta-band antenna device is configured to operate simultaneously across five different frequency bands including L-band (approximately 1.5 GHZ), X-band (approximately 12 GHz), K-band (approximately 18.5 GHz and 26 GHz), and Ka-band (approximately 32 GHz). The antenna device is fabricated on a substrate (for example, Rogers RT/Duroid 5880 substrate).

In one embodiment, the substrate has a relative permittivity (er) of 2.2, a loss tangent (tanδ) of 0.009, and a substrate thickness of 0.79 mm.

In one embodiment, the overall dimension of the L-band antenna is 5.5 cm×5.5 cm. The L-band antenna has two orthogonal feed positions to realize circular polarization.

In one embodiment, a four-square size slot is etched from the inside of the L-band antenna. The Ka-band antenna is integrated into that slot, having slot dimensions of 14 mm×14 mm (L1×W1).

The X-band, K-band1, K-band2, and Ka-band antennas each is a corner-truncated patch to realize left-hand circular polarization (LHCP). The ground of all antennas is separated by symmetrically etching the copper from the ground plane of the L-band antenna with dimensions of 10 mm×10 mm (L2×W2). Each ground plane of the X-band, K-band1, K-band2, and Ka-band antennas is separated from the ground plane of the L-band antenna by 2 mm, as denoted by reference symbol "a" in FIG. 1.

The penta-band antenna device is well-suitable for the 3U CubeSat, with dimensions designed to fit in the side of the CubeSat (for example, 20 cm×20 cm) without the need for a deployable wing structure.

According to the embodiments of the subject invention, the penta-band antenna device addresses the substantial disparity in operating wavelengths between the lowest and highest frequency bands. Specifically, the wavelength difference between the maximum frequency of Ka-band operating at 32 GHz and having 2=9.3 mm and the minimum frequency of L-band operating at 1.5 GHz and having 2=200 mm is more than 21 times (9.3 mm×21.5=200 mm). Accommodating such a broad range of wavelengths using a single substrate and same thickness presents significant design challenges.

Figure 2:
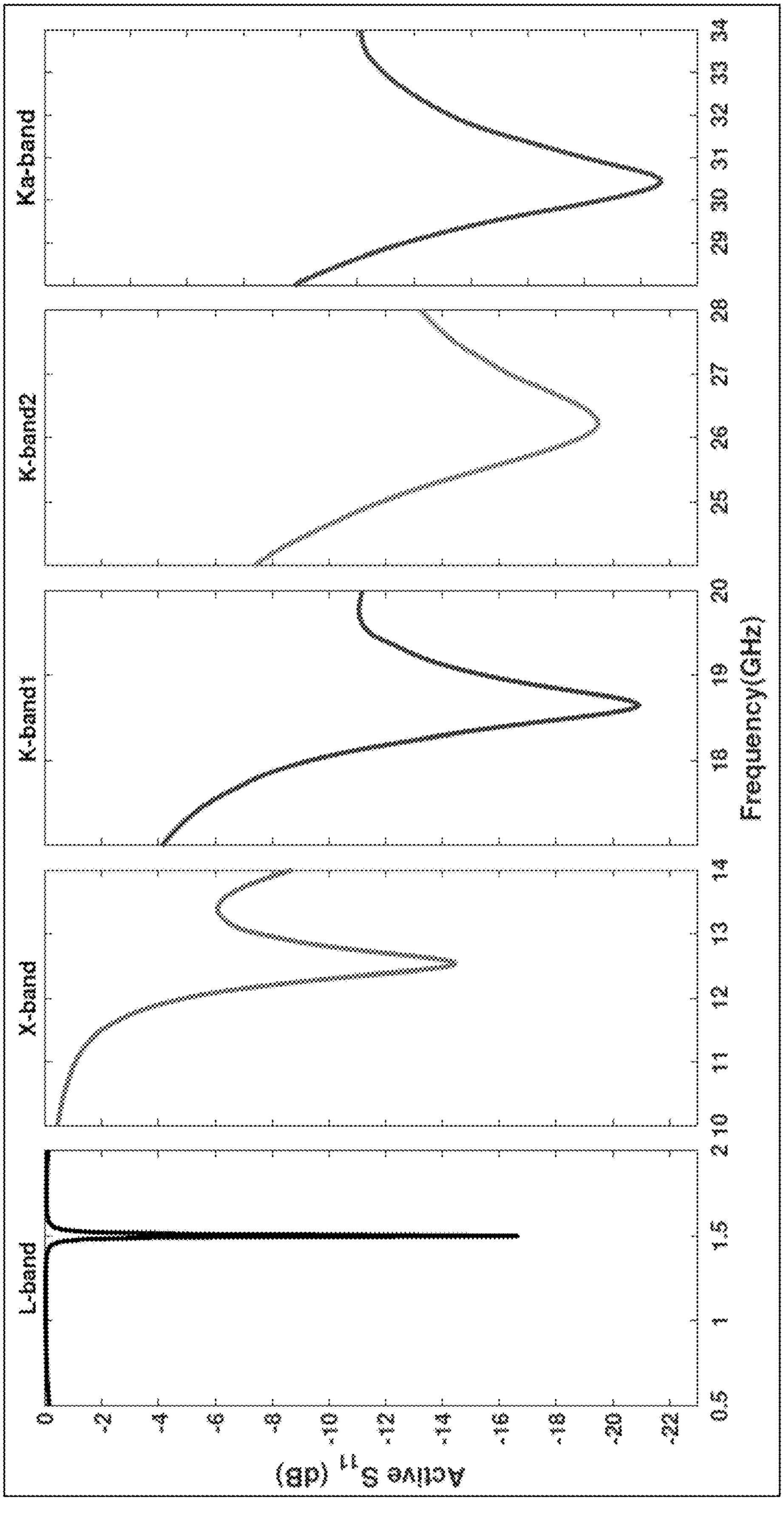
FIG. 2 shows the simulation results of active S11 of the penta-band antenna device, according to an embodiment of the subject invention.

Referring to FIG. 2, the S11 characteristics of the penta-band antenna are illustrated. The L-band antenna exhibits resonance at approximately 1.5 GHz, with a bandwidth of 1.5%. The X-band, K-band1, and K-band2 antennas demonstrate comparatively wider bandwidth and exhibit strong resonances near 12.5 GHZ, 18.5, and 26 GHz, respectively.

In contrast, the Ka-band antenna exhibits a wide operational bandwidth, covering the frequency range from approximately 29 GHz to 34 GHz. All antennas with the exception of the L-band antenna, demonstrate wide bandwidth. The enhanced bandwidth performance is attributed to the implementation of corner perturbations or corner truncation techniques.

Figure 3:
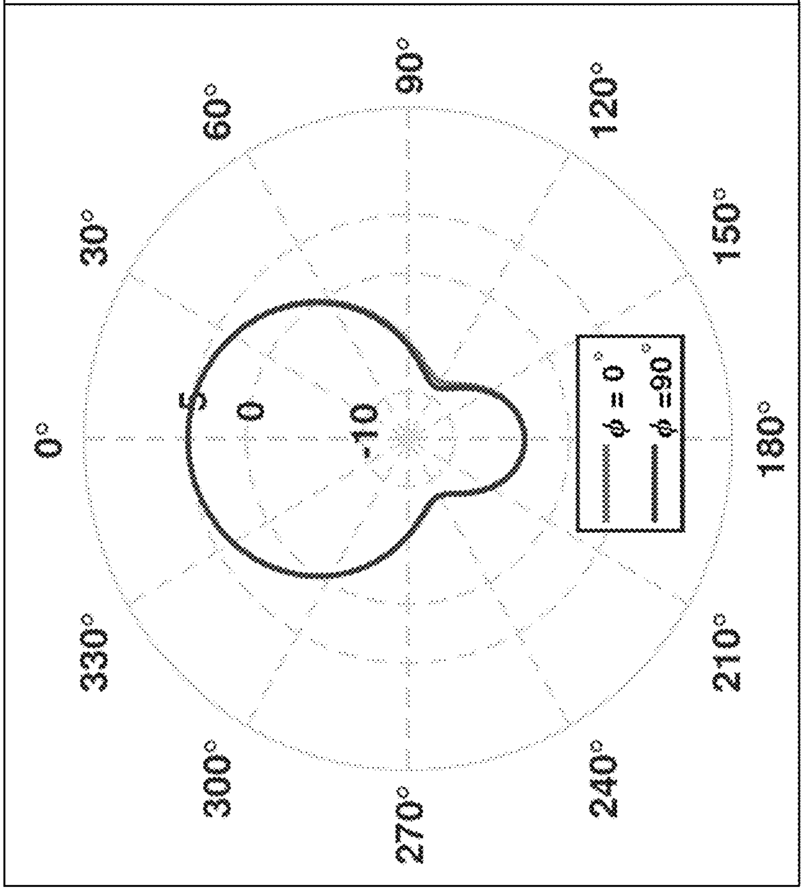
FIG. 3 shows the radiation pattern of the L-band antenna of the penta-band antenna device, operating at 1.5 GHZ, according to an embodiment of the subject invention.
Figure 4:
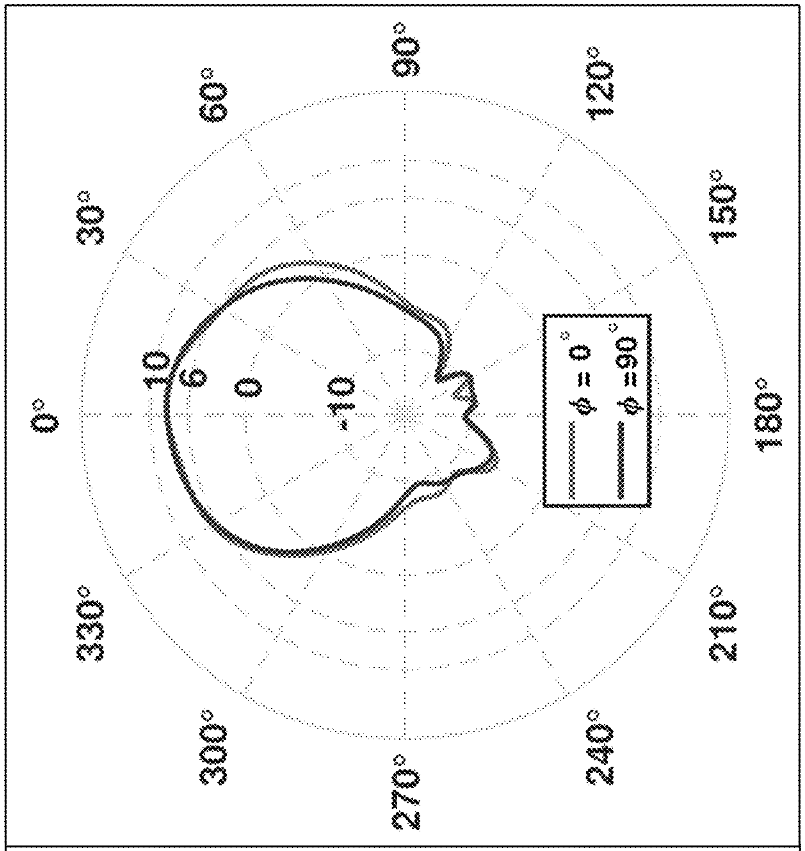
FIG. 4 shows the radiation pattern of the X-band antenna of the penta-band antenna device, operating at 12 GHz, according to an embodiment of the subject invention.
Figure 5:
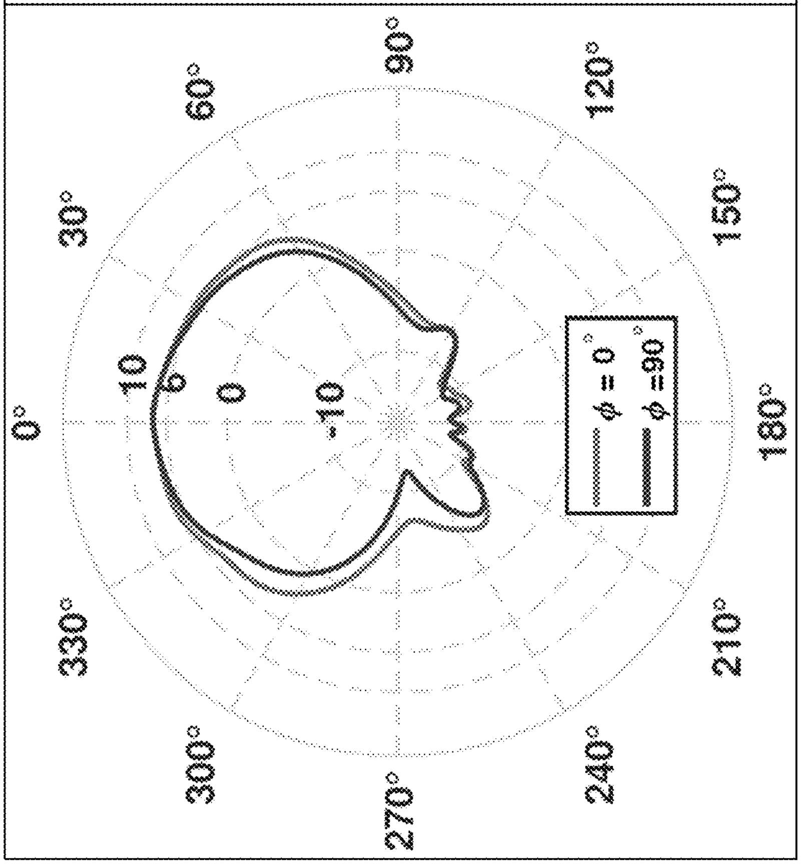
FIG. 5 shows the radiation pattern of the K-band1 antenna of the penta-band antenna device, operating at 18.6 GHz, according to an embodiment of the subject invention.
Figure 6:
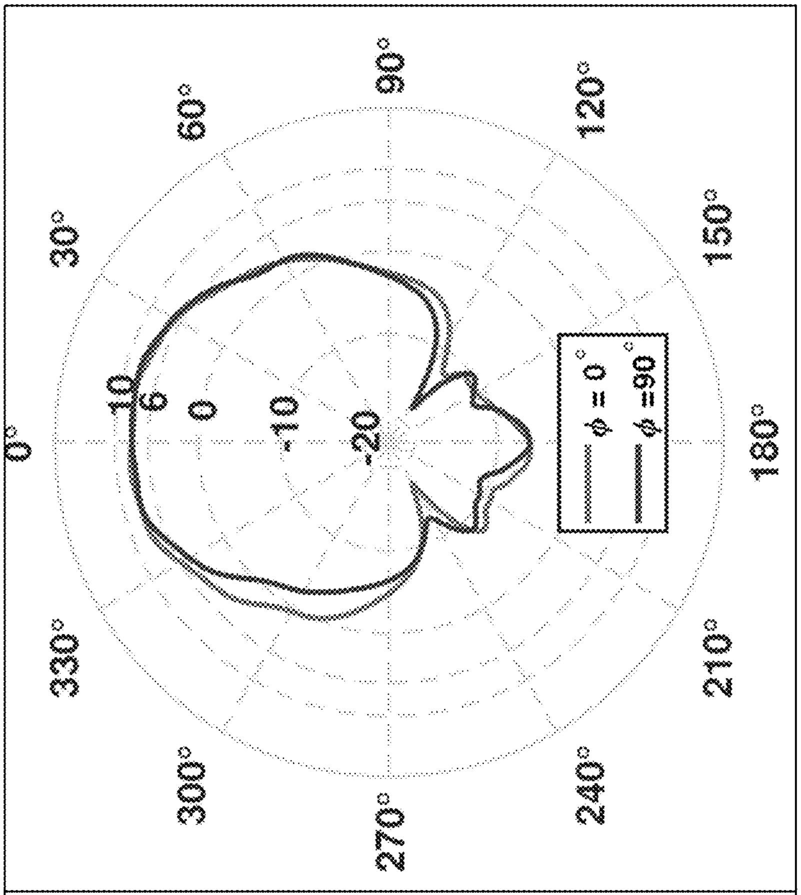
FIG. 6 shows the radiation pattern of the K-band2 antenna of the penta-band antenna device, operating at 26.4 GHz, according to an embodiment of the subject invention.

In one embodiment, the L-band antenna achieves a realized gain of approximately 5.05 dBi in both the E-plane and H-plane, as illustrated in FIG. 3. The realized gains of the X-band, K-band1, and K-band2 patch antennas are approximately 7.8 dBi, 7.1 dBi, and 7.97 dBi at 12.5 GHz, 18.5 GHZ, and 26 GHz, respectively, as depicted in FIG. 4, FIG. 5 and FIG. 6.

Figure 7:
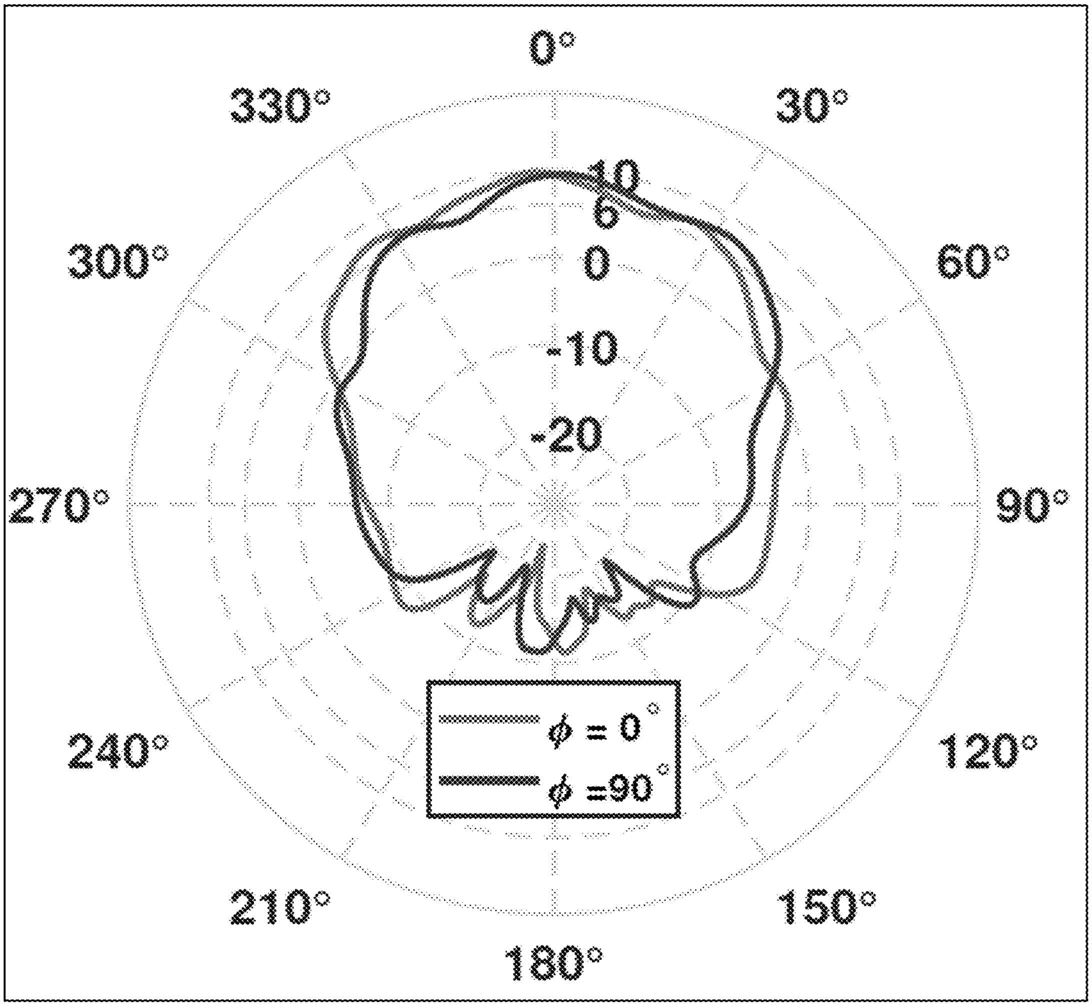
FIG. 7 shows the radiation pattern of the Ka-band antenna of the penta-band antenna device, operating at 32 GHz, according to an embodiment of the subject invention.
Figure 8:
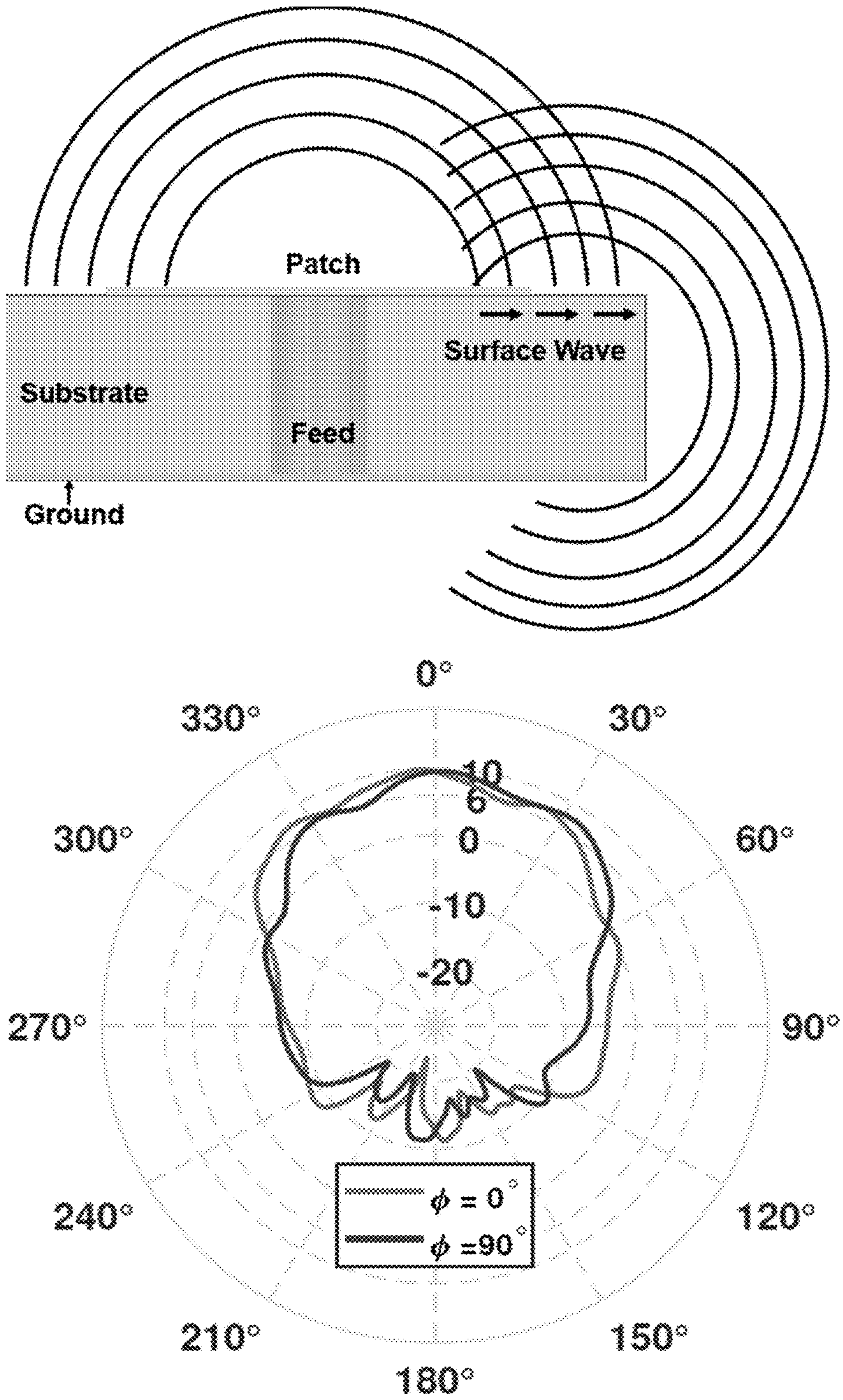
FIG. 8 illustrates how the surface waves degrade the radiation pattern at 32 GHz, as shown by the ripples, according to an embodiment of the subject invention.

However, the realized gain of the Ka-band operating at 32 GHz is approximately 9.97 dBi and the pattern is notably distorted in both the E-plane and H-plane as illustrated in FIG. 7. The distortion is primarily attributed to the interference of surface waves at approximately 32 GHz due to the finite ground plane. FIG. 8 further illustrates how the radiation of the surface waves degrades the radiation pattern at 32 GHz.

Figure 9:
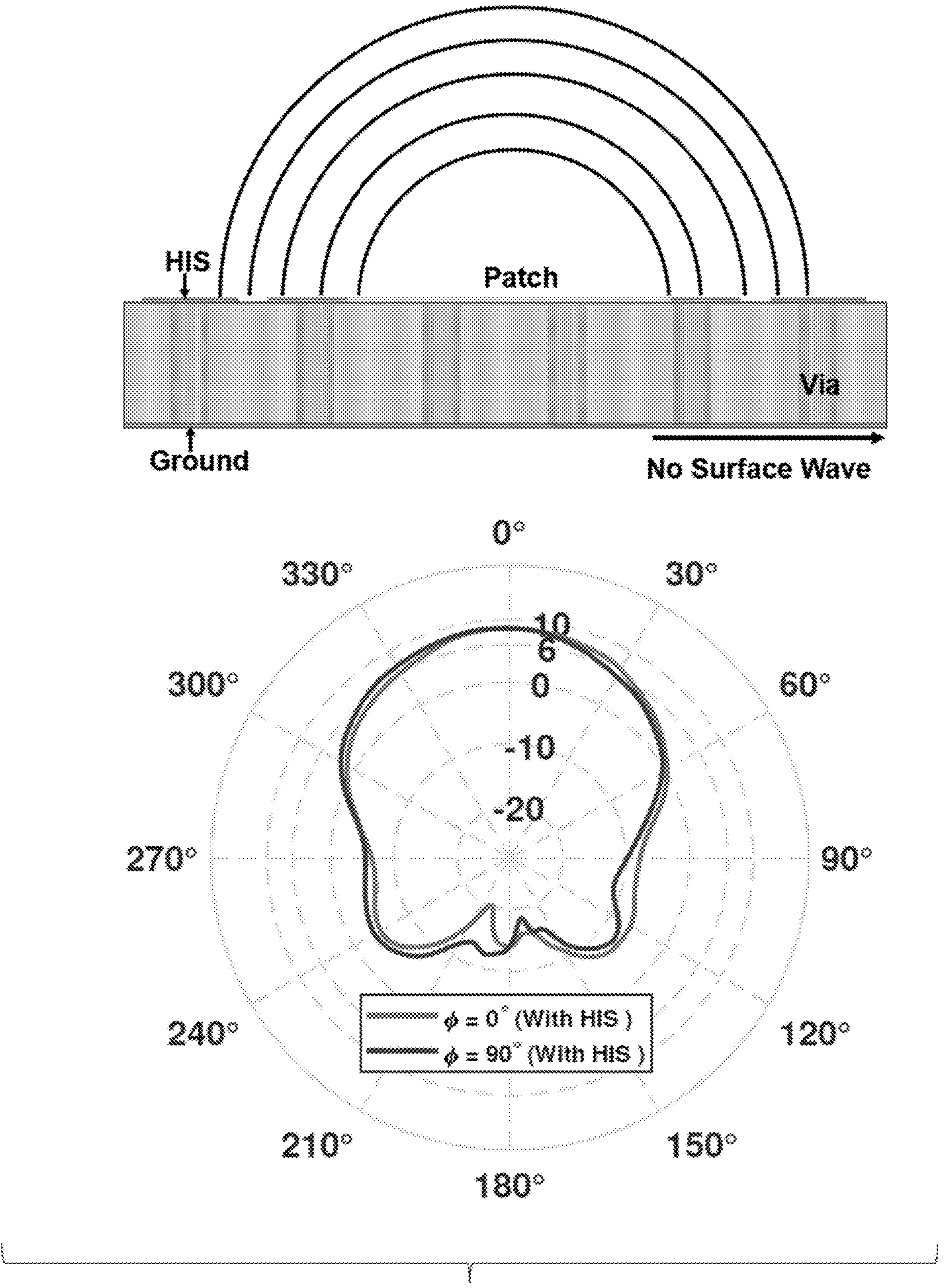
FIG. 9 illustrates the reduction of the surface waves using a high impedance surface (HIS) at 32 GHZ, as shown by the absence of ripples, according to an embodiment of the subject invention.
Figure 10:
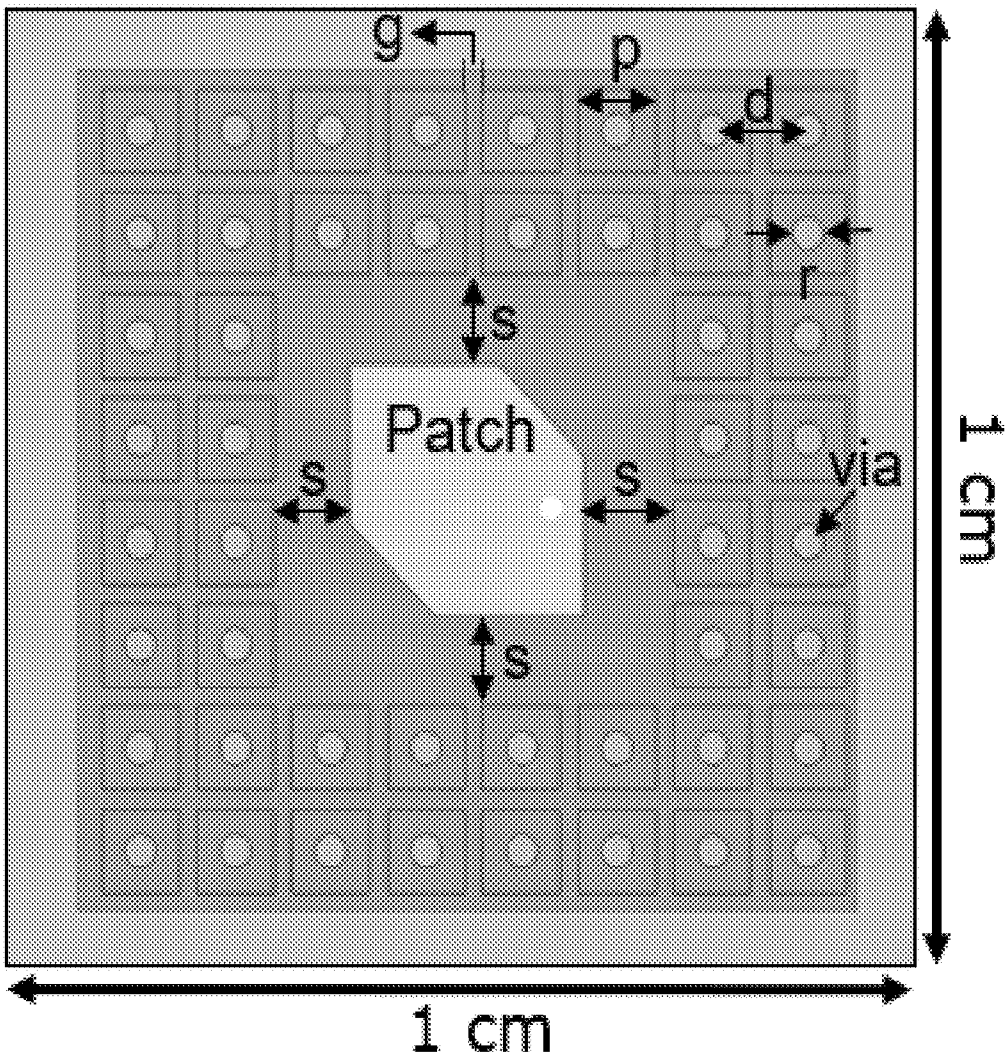
FIG. 10 shows the integration of HIS with the patch antenna at 32 GHz, according to an embodiment of the subject invention.
Figure 11:
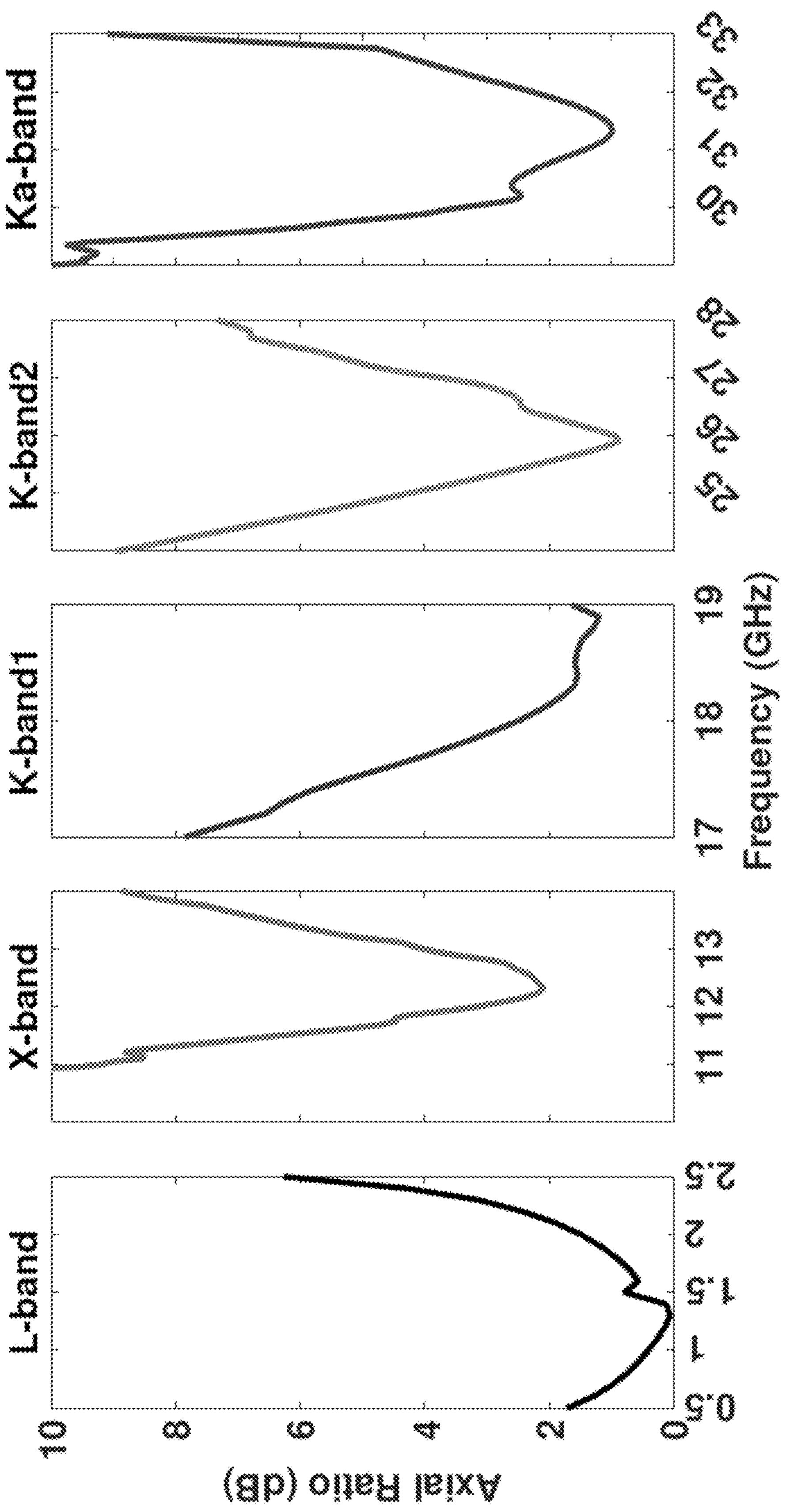
FIG. 11 shows the simulated axial ratios for the L-band, X-band, K-band1, K-band2, and Ka-band of the penta-band antenna device, according to an embodiment of the subject invention.

As a solution, integrating a high-impedance surface (HIS) around the patch helps mitigate surface waves, resulting in a free radiation pattern, as demonstrated in FIGS. 9 and 10. FIG. 11 presents the simulated axial ratio performance.

Figure 12:
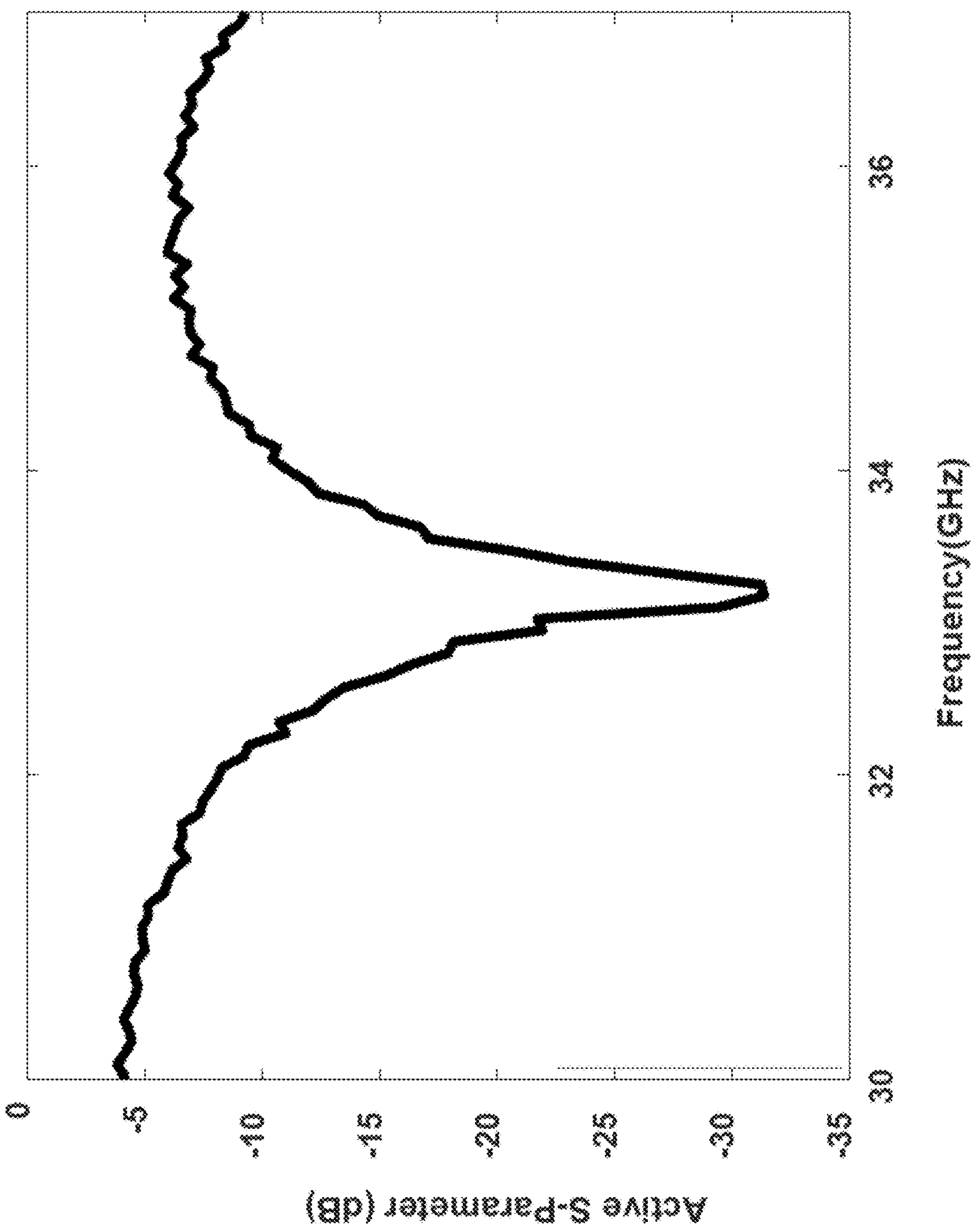
FIG. 12 shows the measured S11 of the Ka-band antenna of the penta-band antenna device, operating at 32 GHz, according to an embodiment of the subject invention.
Figure 13:
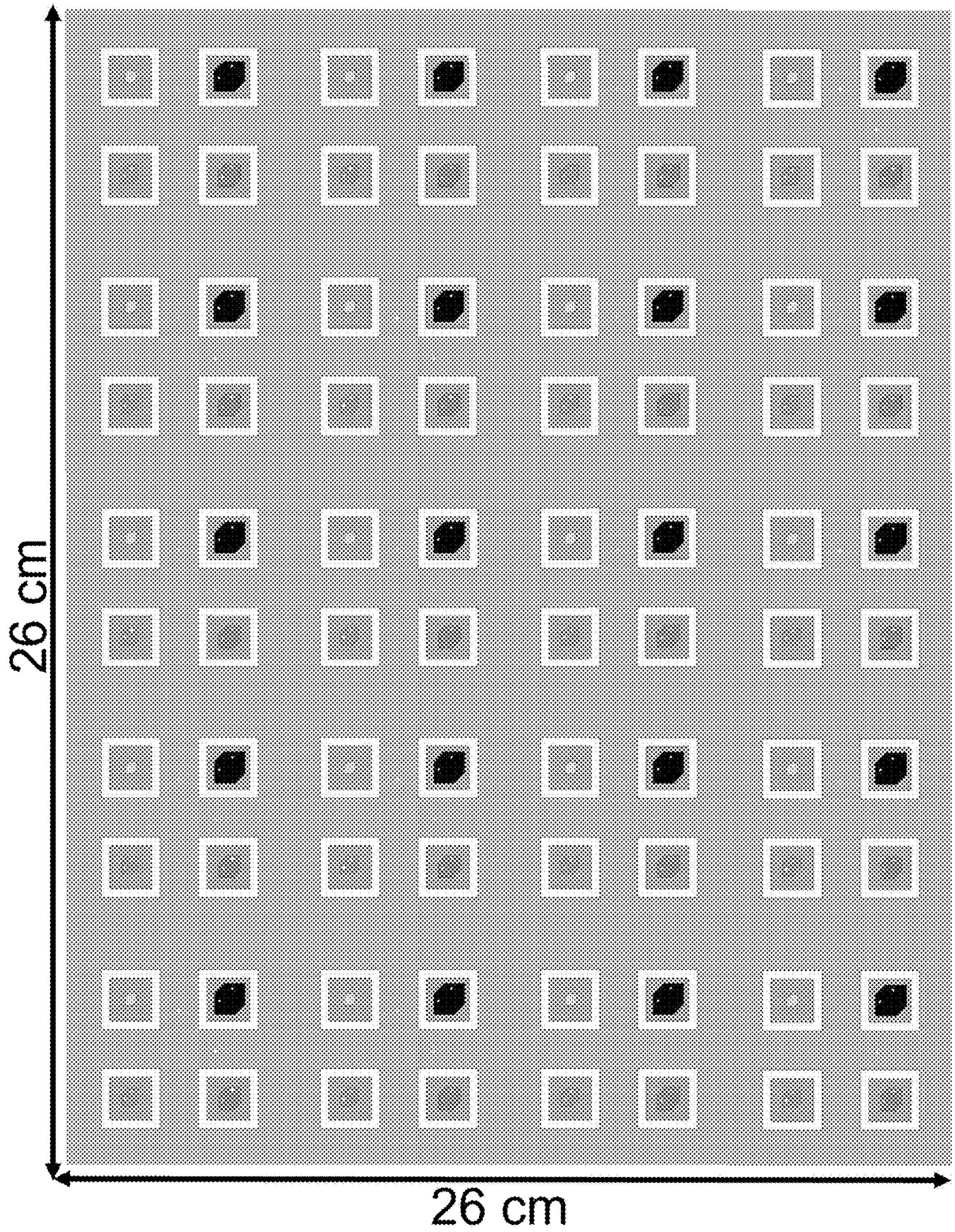
FIG. 13 is a schematic representation of the antenna array of a plurality of the penta-band antenna devices, according to an embodiment of the subject invention.

The measured S11 of the Ka-band antenna is presented in FIG. 12. FIG. 13 shows an antenna array including a plurality of the penta-band antenna devices for the CubeSat applications.

The full-wave simulations are performed using ANSYS High-Frequency Structure Simulator (HFSS). As shown in FIG. 2, the simulated S11 of the penta-band antenna indicates that each antenna resonates near its operating frequency. FIG. 11 illustrates the axial ratios of the penta-band antenna device.

Figure 14:
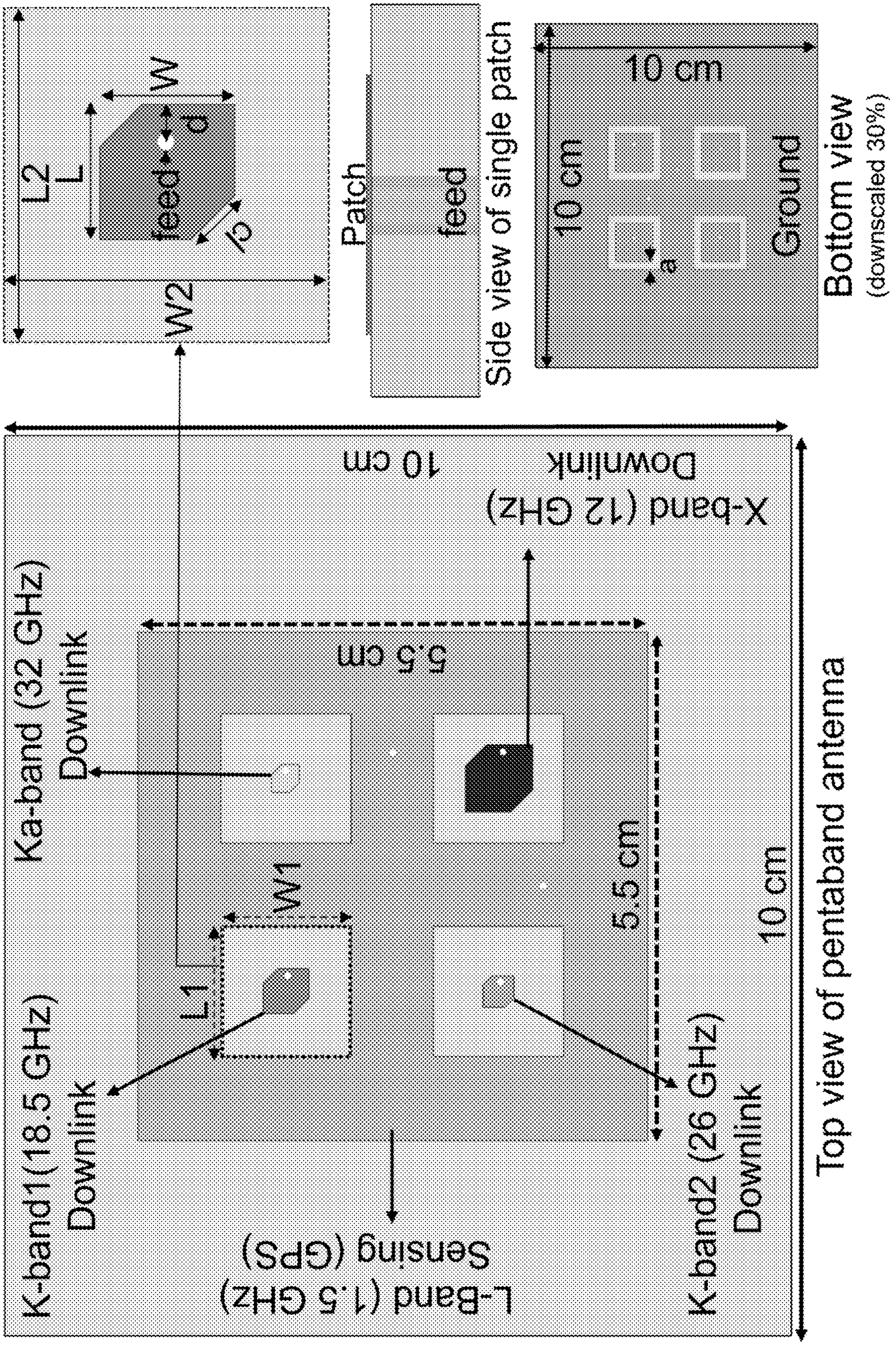
FIG. 14 shows the top view, the side view, and the bottom view of the penta-band antenna device, according to an embodiment of the subject invention.

As shown in FIG. 14, the penta-band antenna device comprises a square-shaped L-band antenna with four symmetrically etched quad-gaps.

Four antennas of different bands, namely, X-band, K-band1, K-band2, and Ka-band are inserted into the four quad-gaps of the L-band antenna, respectively. The X-band, K-band1, K-band2, and Ka-band antennas are designed to achieve left-hand circular polarization (LHCP) with corner truncation techniques. They have separate ground planes to reduce the surface wave and increase the isolation.

The L-band antenna includes two orthogonal feeding positions, enabling switching between linear and circular polarization when needed. In contrast, the X-band, K-band1, K-band2, and Ka-band antennas each have only a single feed and corner perturbation for LHCP.

In one embodiment, the Ka-band antenna operating at 32 GHz can be integrated with a high-impedance surface (HIS) to minimize the surface wave that arises from the finite discontinuity of the ground plane.

Results

The aperture-shared penta-band antenna device is shown in FIG. 14. The antenna device operates at the L-band (1.5 GHZ), X-band (12 GHz), K-bands (18.5 and 26 GHz), and Ka-band (32 GHz) simultaneously. For example, the substrate is a RT/Duroid 5880 substrate (Er=2.2 and tanδ=0.009), with a thickness of 0.79 mm. The unit antenna comprises one L-band patch, one X-band patch, two K-band patches, and one Ka-band patch inside the L-band antenna. The four square-size slots are etched from the inside of the L-band antenna, and the four different bands of the antenna are integrated into that gap. The slot dimension is 14 mm×14 mm (L1×W1). The overall dimension of the penta-band antenna is 10 cm×10 cm. The L-band antenna is designed with two orthogonal feed positions to realize the circular polarization. The other band antennas employed truncated patches to realize the LHCP. The ground of all antennas is separated by symmetrically etching the copper from the ground plane of the L-band antenna with dimensions of 10 mm×10 mm (L2×W2). Each ground plane (X to Ka-band) is separated by 2 mm, which is depicted by "a" in FIG. 14. The presented antenna is suitable for the 1 U CubeSat that will fit in the side of the CubeSat (10 cm×10 cm), eliminating the need for a deployable wing.

The wavelength difference between maximum and minimum frequency (Ka-band (32 GHz, λ=9.3 mm) and L-band (1.5 GHZ, 2=200 mm)) is more than 21 times (9.3 mm×21.5=200 mm). Designing this AIA antenna using the same substrate and thickness is critical as the wavelength difference is too high. For that, the full-wave simulation needs to run for a long time to optimize the design. The optimized design parameters for each band antenna are shown in Table 1.

Figure 15:
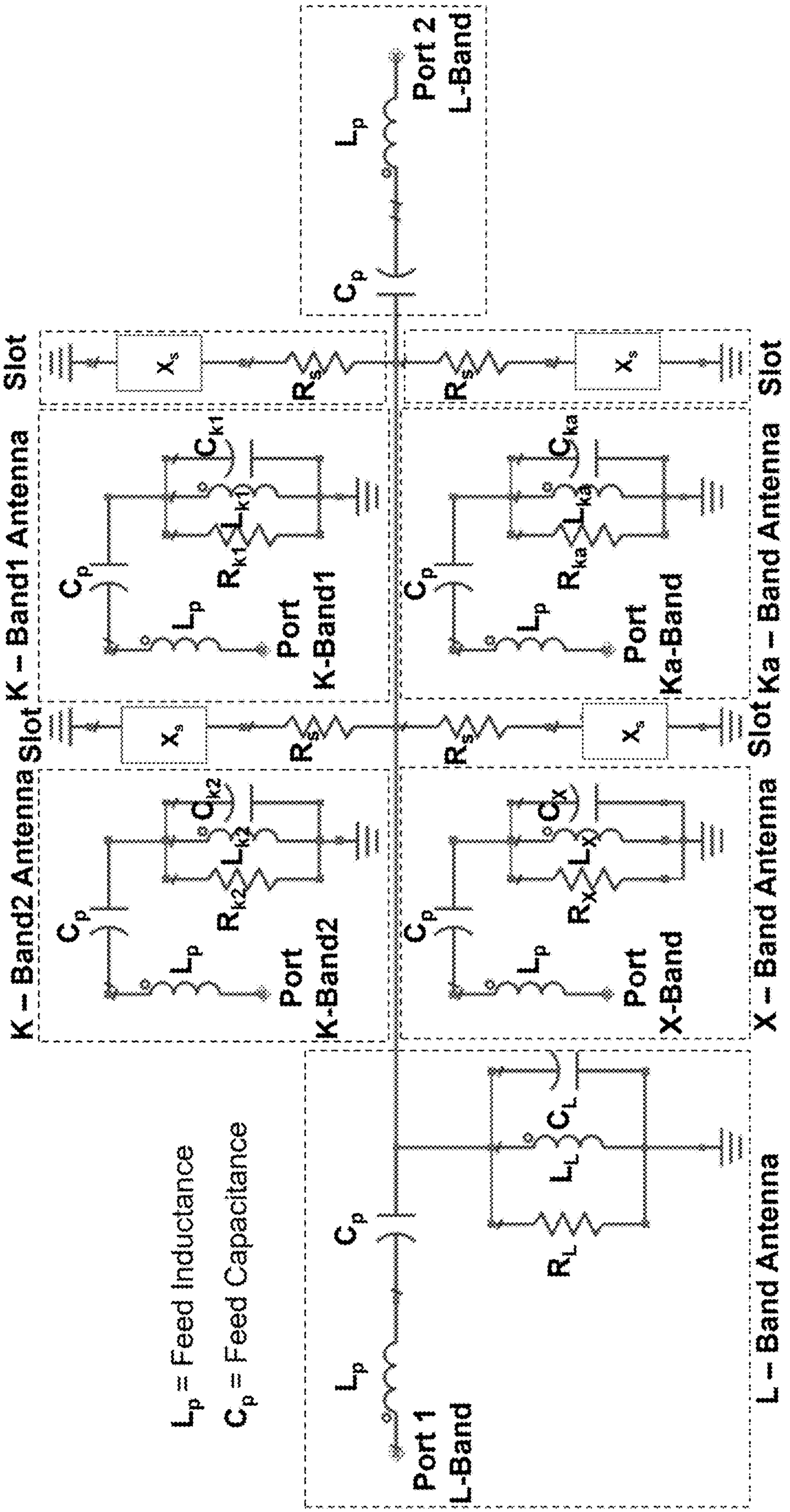
FIG. 15 is a schematic representation of the equivalent circuit model of the penta-band antenna device, according to an embodiment of the subject invention.

FIG. 15 illustrates the equivalent circuit model of the penta-band antenna of the subject invention. In modeling the equivalent circuit, it is essential to consider both the feed inductance and capacitance. The feed inductance and capacitance are represented by $L_P$ and $C_P$, respectively.

A microstrip patch antenna can be modeled as a parallel RLC circuit, where $R_L$, $C_L$, and $L_L$ represent the resistance, capacitance, and inductance of the L-band antenna, respectively. The L-band antenna incorporates four quad gaps or slots that allow the integration of four additional bands. Each of these slots can be modeled as a series of resistance and reactance, denoted by Rs and Xs, respectively. Similarly, the X-band, K-band1, K-band2, and Ka-band antennas can be modeled as RLC circuits, as shown in FIG. 15. These four bands have separate ground planes. $R_X$, $C_X$, and $L_X$ are the resistance, capacitance, and inductance of the X-band antenna. Similarly, $R_{K1}$, $C_{K1}$, and $L_{K1}$ respectively represent the resistance, capacitance, and inductance of the K-band1 antenna; $R_{K2}$, $C_{X2}$, and $L_{K2}$ respectively represent the resistance, capacitance, and inductance of the K-band2 antenna; and $R_{Ka}$, $C_{Ka}$, and $L_{Ka}$ respectively represent the resistance, capacitance, and inductance of the Ka-band antenna.

Figure 16:
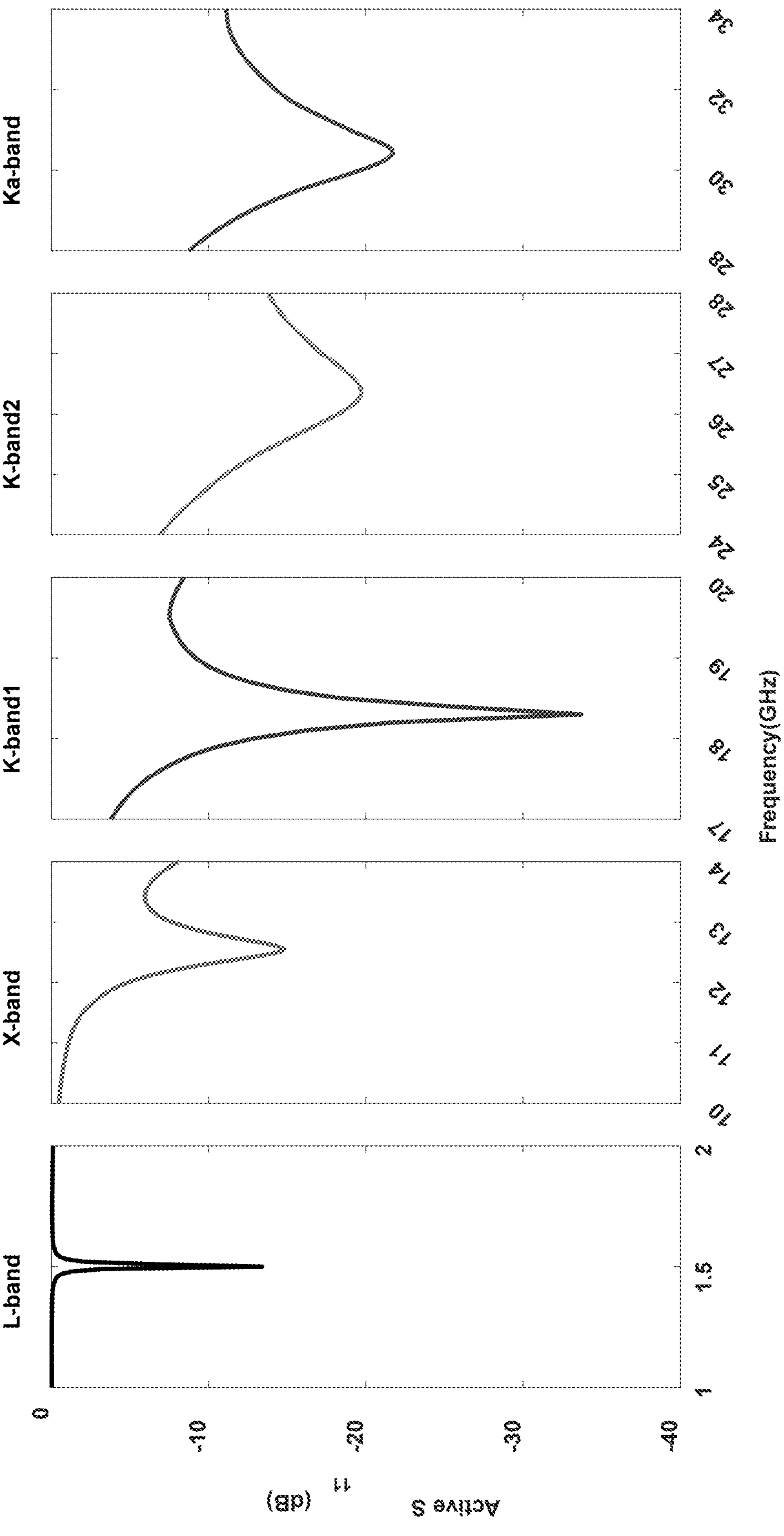
FIG. 16 shows the respective simulated active S'11 of the L-band, X-band, K-band1, K-band2, and Ka-band of the penta-band antenna device, demonstrating an excellent match for the designated frequency bands, according to an embodiment of the subject invention.

FIG. 16 illustrates the S11 of the penta-band antenna device. The L-band antenna exhibits a resonance at 1.5 GHz with a bandwidth of approximately 1.5%.

In comparison, the X-band, K-band1, and K-band2 antennas demonstrate higher bandwidths and strong resonances near 12.5 GHz, 18.5, and 26 GHz, respectively.

On the other hand, the Ka-band antenna operates across a frequency range of approximately 29 to 34 GHz.

All antennas, except the L-band antenna, show relatively broad bandwidths. This is primarily attributed to two key factors: implementation of a corner perturbation and a higher ratio of substrate height to free-space wavelength ratio ($h/\lambda_0$). Moreover, the antenna's bandwidth is inversely proportional to the patch antenna's quality factor Q, defined as the ratio of energy stored to power lost. Lower Q factor results in higher bandwidth and vice versa. The Q factor increases with a higher dielectric constant and decreases with an increase in substrate thickness. Therefore, a low dielectric constant and a thicker substrate are desirable for high bandwidths.

In one embodiment, a substrate material with a low dielectric constant (Er=2.2) is selected due to its superior performance and low loss tangent over a wide frequency range. However, a substrate thickness of h=0.79 mm is selected as a design compromise, balancing the requirements between the lowest (1.5 GHZ) and highest frequency (32 GHz) antenna characteristics, while also considering the spatial and weight constraints of the CubeSat.

For the 1.5 GHz antenna, the $h/\lambda_0$ ratio is approximately 0.00395, corresponding to a bandwidth of just over 1.3%. As frequency increases, since $\lambda_0$ decreases with increasing frequency, the $h/\lambda_0$ ratio increases, thereby lowering the Q factor for the X-band (12 GHz), Ka-bands (18 and 26 GHZ), and K-band (32 GHz) antennas, which in turn increases their bandwidth up to approximately 5%.

Among the five different antenna bands, the configurations of the L-band antenna are particularly critical due to its miniaturized nature.

In one embodiment, the calculated dimensions for the L-band antenna, considering the specified dielectric (for example, $\varepsilon_r$=2.2, height=0.79 mm), are 79 mm in width and 67 mm in length. The width is reduced to accommodate the integration of additional antenna bands, creating a square-shaped antenna with dimensions of 55 mm×55 mm. This modification is achieved by cutting four symmetrical slots inside the L-band antenna. The square shape is selected to facilitate circular polarization through the two orthogonal feeds.

Figure 17:
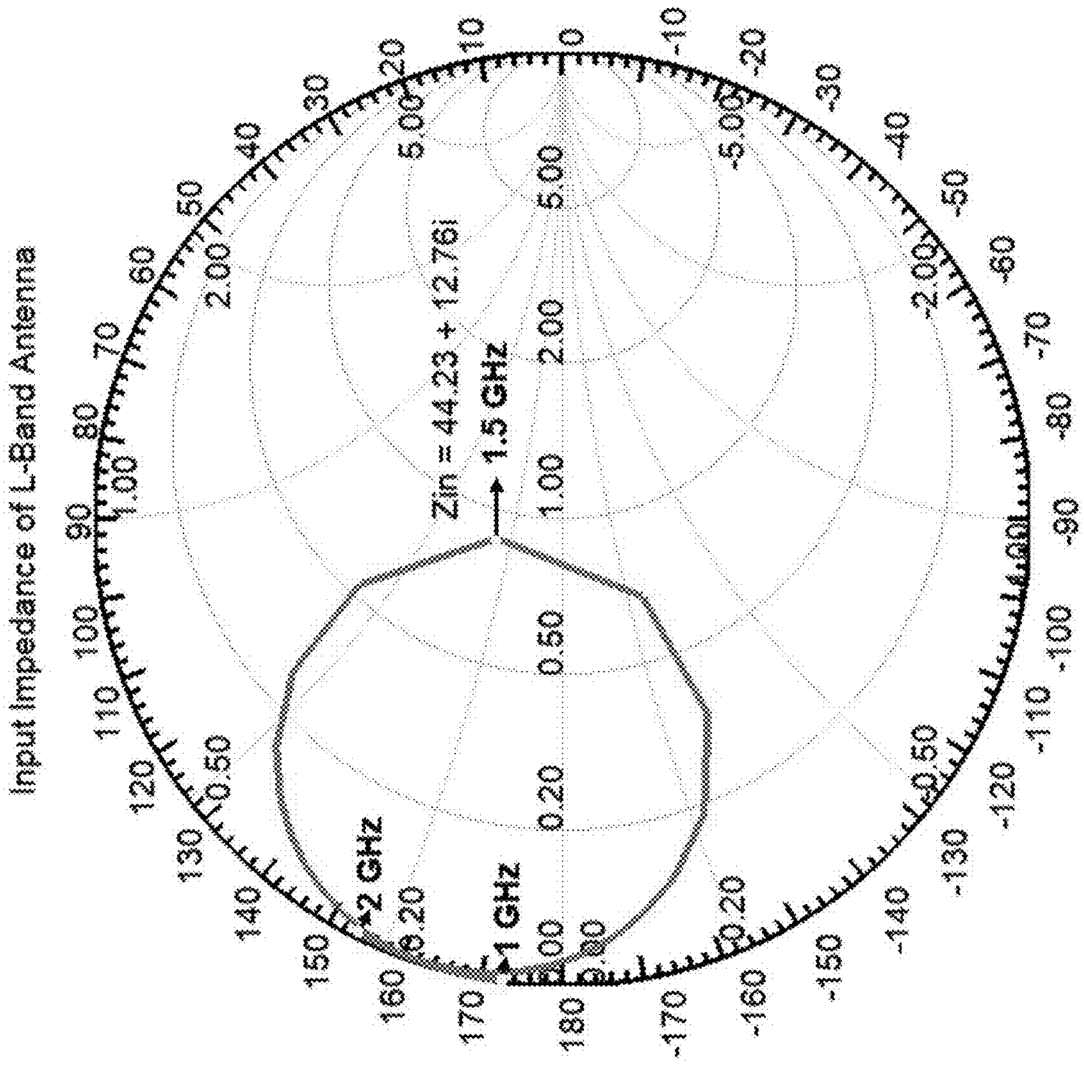
FIG. 17 illustrates the Smith chart showing input impedance of the L-band antenna of the penta-band antenna device, according to an embodiment of the subject invention.

FIG. 17 presents the input impedance of the penta-band antenna device plotted on a Smith chart. The L-band antenna is highly inductive up to approximately 1.5 GHz and highly capacitive beyond 1.51 GHz. The input impedance of the L-band antenna is approximately 44.23+12.76i, corresponding to the S11 of approximately-17 dB at 1.5 GHz.

Figure 18A:
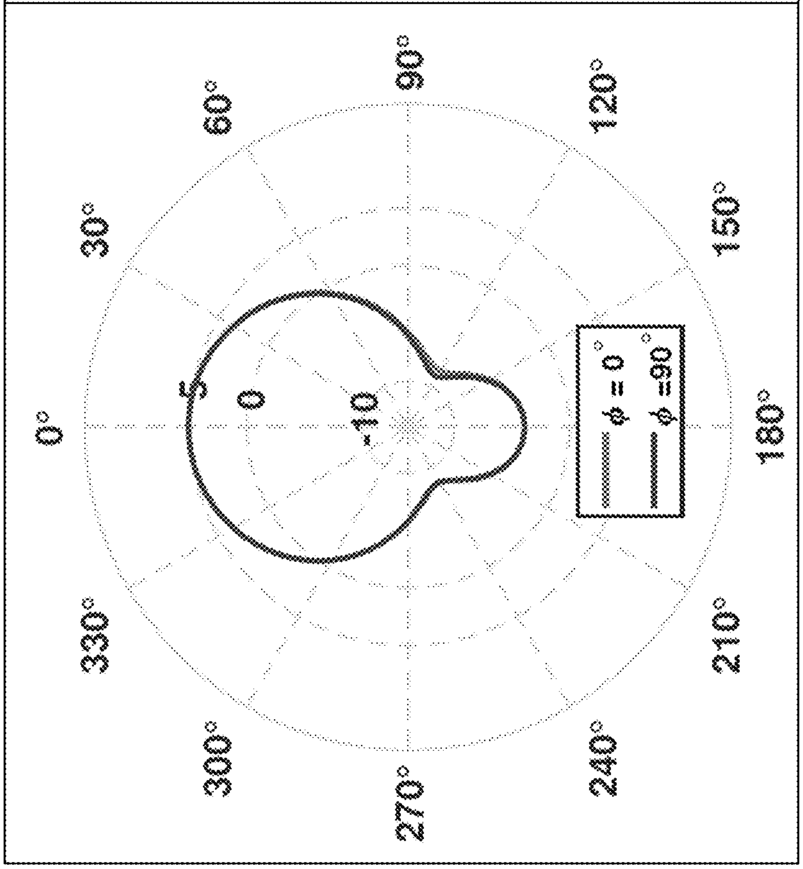
FIGS. 18*a*-18*e* show simulated realized gain at 1.5 GHz (FIG. 18*a*), 12 GHz (FIG. 18*b*), 18.5 GHz (FIG. 18*c*), 26 GHz (FIG. 18*d*), and 32 GHz (FIG. 18*e*), according to an embodiment of the subject invention.
Figure 18B:
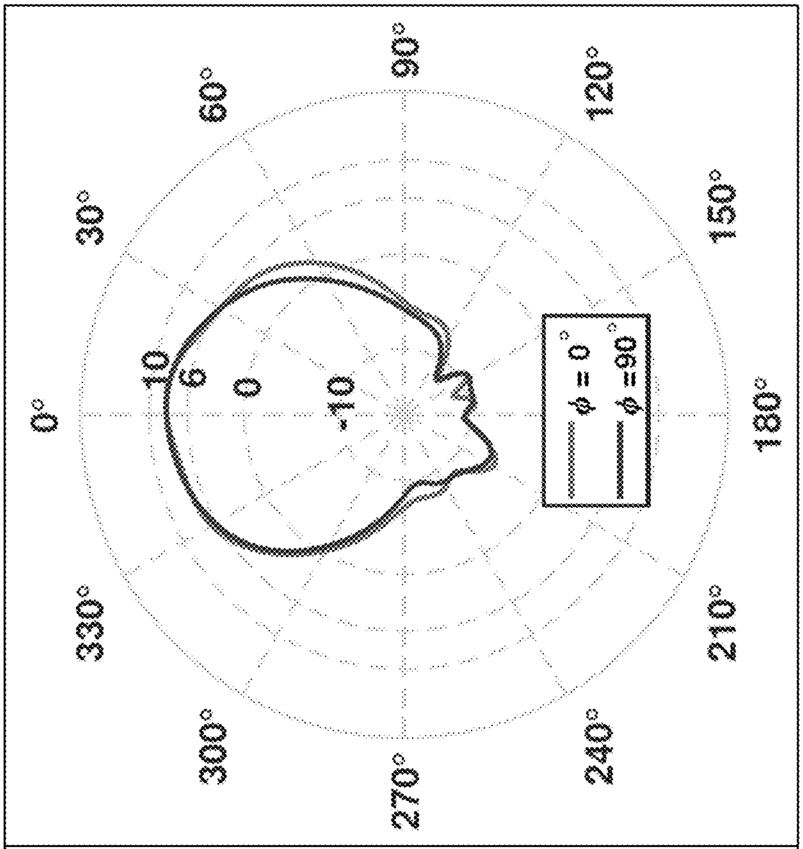
Figure 18D:
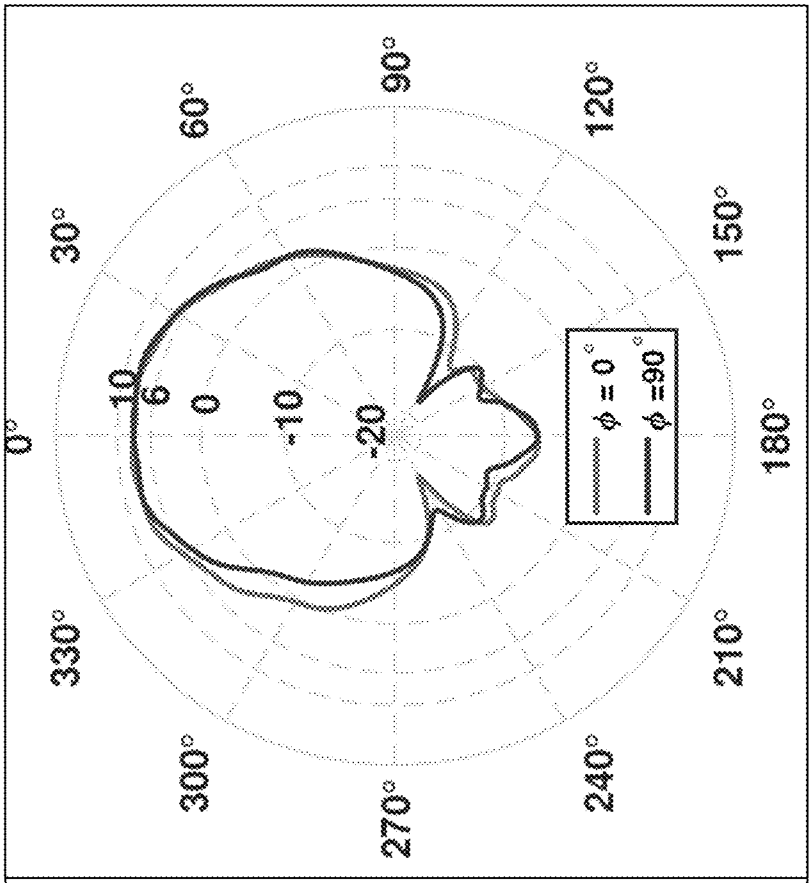
Figure 18C:
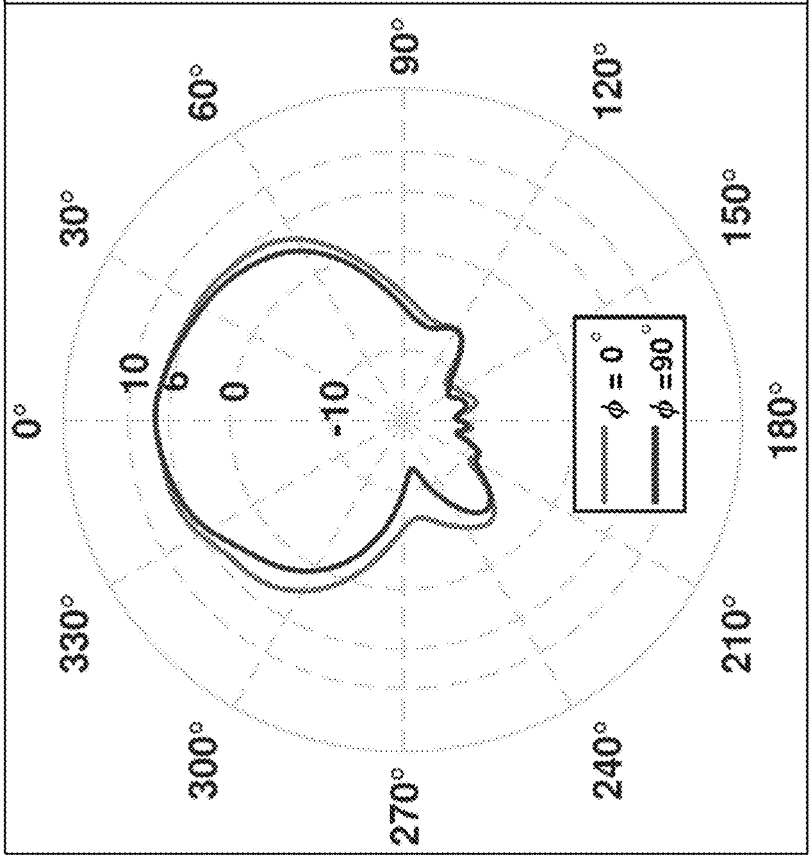
Figure 19A:
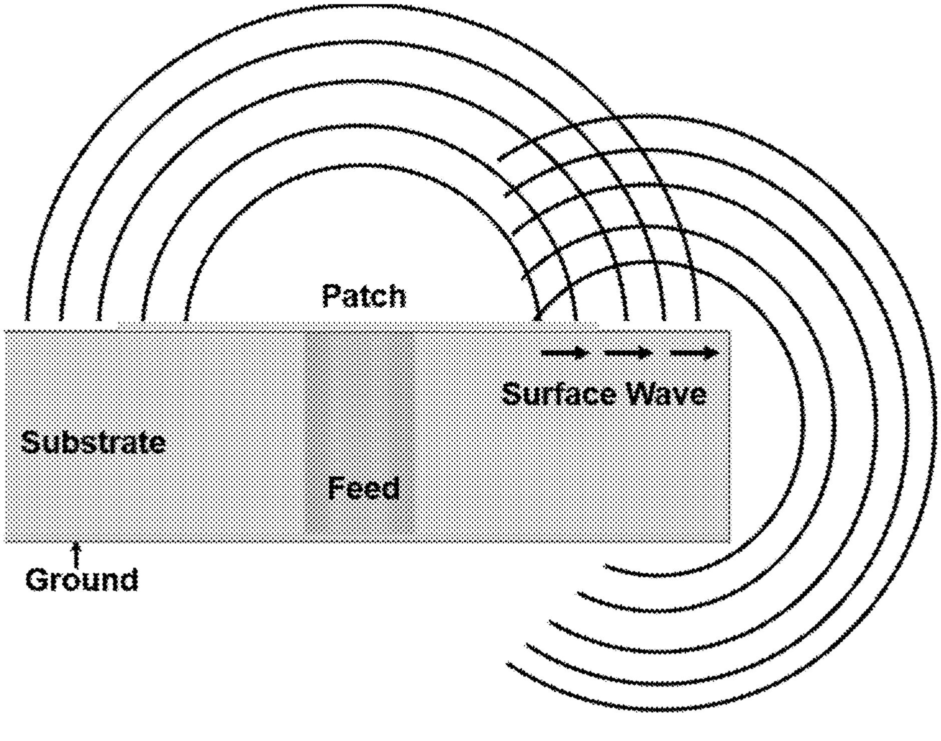
FIG. 19*a* shows the patch antenna device on a finite ground plane creating a surface wave that distorts the radiation pattern due to interference.
Figure 19B:
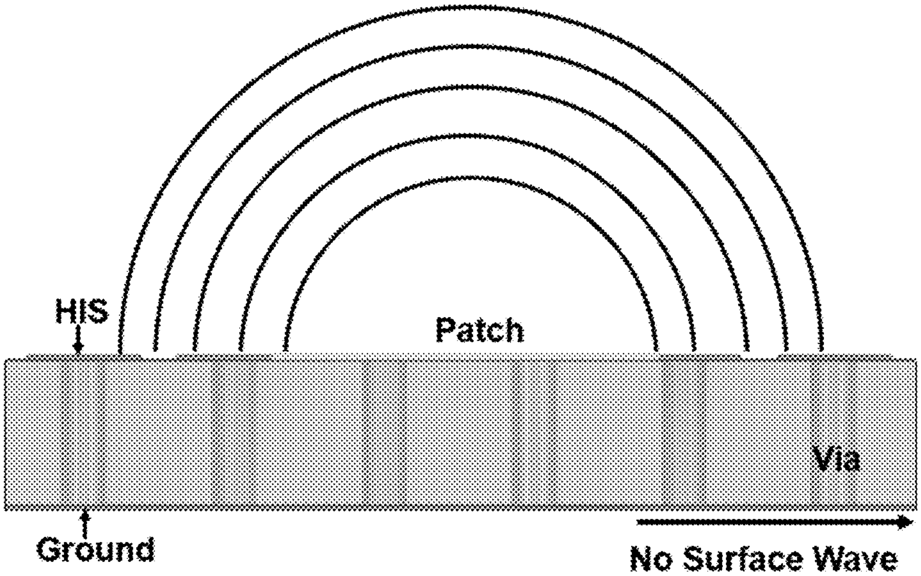
FIG. 19*b* shows the patch antenna with a high impedance surface mitigating the surface waves and restoring the radiation pattern, according to an embodiment of the subject invention.

The realized gain of the L-band antenna is 5.05 dBi for both the E-plane and H-plane, as shown in FIG. 18*a*. The realized gains of X-band, K-band1, and K-band2 are 8.21 dBi, 7.33 dBi, and 7.97 dBi at 12.5, 18.5, and 26 GHz, respectively, as shown in FIGS. 19*b*-19*d*.

Figure 18E:
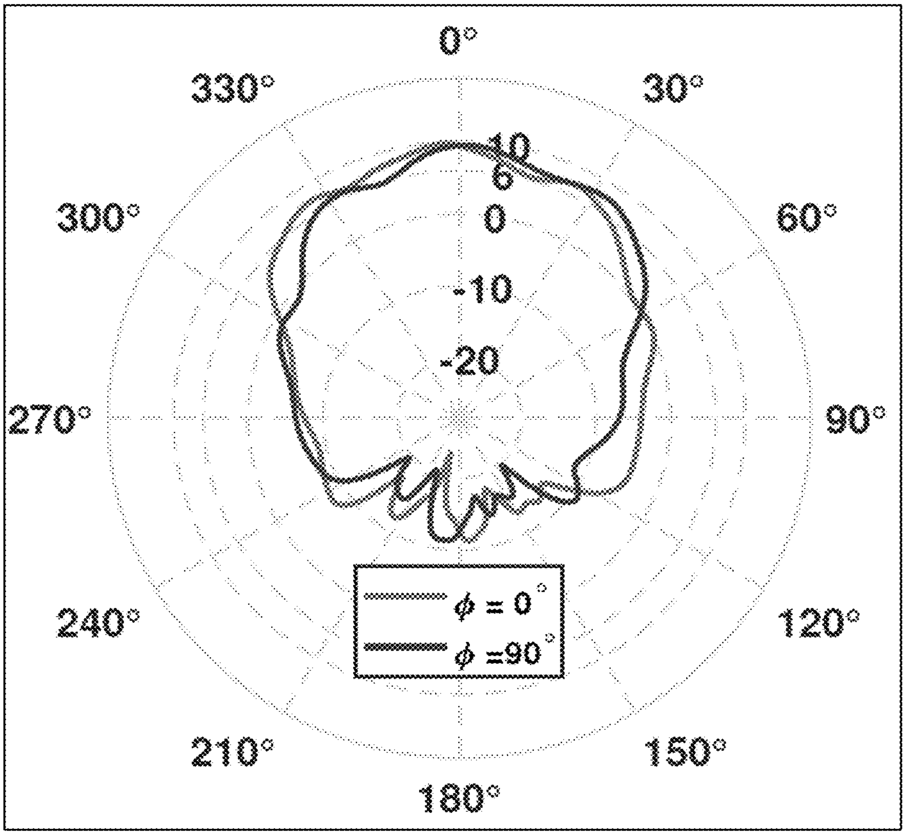

However, the realized gain at 32 GHz is 8.56 dBi, and the pattern is distorted in both the E-plane and the H-plane, as shown in FIG. 18*e*. This distortion is primarily attributed to the interference of surface waves at 32 GHz from the finite ground plane. Techniques for mitigating surface waves are discussed in the following section.

High Impedance Surface Implementation for Ka-Band

A flat metal sheet provides a favorable medium for the propagation of the surface waves. The surface waves propagate as electro-magnetic (EM) waves that travel between the air interface and the metal plate. These waves radiate when there are surface discontinuities.

The penta-band antenna has a finite ground plane, discontinuities, and cutting edges along the axis. Hence, the surface waves travel to the edge of the ground plane, radiate vertically, and create interference with the radiated field of the antenna device, as shown in FIG. 19*a*. This interference manifests as ripples in the radiation pattern. These ripples are dominant and more visible in the Ka-band antenna, as shown in FIG. 18*e*.

The energy carried by surface waves depends on the ratio of the substrate height to wavelength ($h/\lambda_0$). As this ratio increases, so does the power carried by the surface waves. This ratio is negligible for low frequencies (for example, for L-band), making the effect of surface waves on the radiation pattern minimal. However, as frequency increases, the impact becomes more noticeable. The radiation patterns for the X-band and Ka-band are affected, resulting in less smooth patterns compared to the patterns of the L-band antenna. The $h/\lambda_0$ ratio is highest for the K-band (32 GHZ) antenna, where the dominant effect of surface waves significantly degrades the radiation pattern.

To mitigate the propagation of the surface waves from the finite ground plane, a new EM structure is presented. This structure is commonly known as a high-impedance surface (HIS). The incorporation of HIS helps to remove the surface waves, thereby inhibiting interference so that ripples in the radiation pattern can be minimized, as shown in FIG. 19*b*.

Figure 20A:
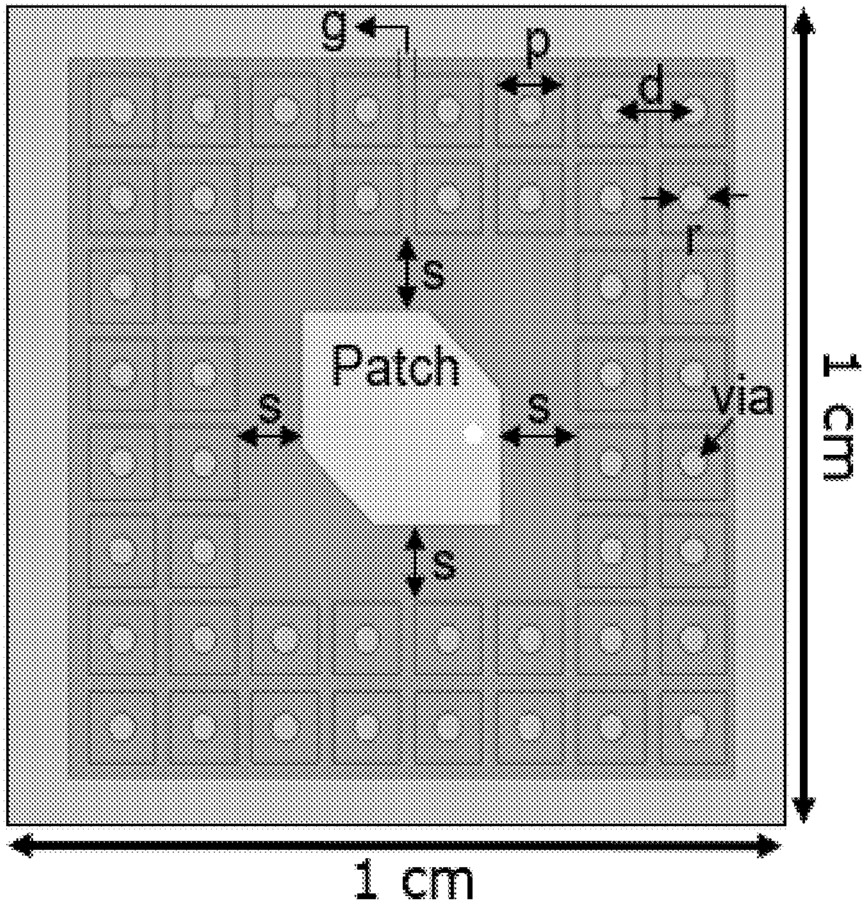
FIG. 20*a* shows the Ka-band antenna of the penta-band antenna device with high impedance surface.
Figure 20B:
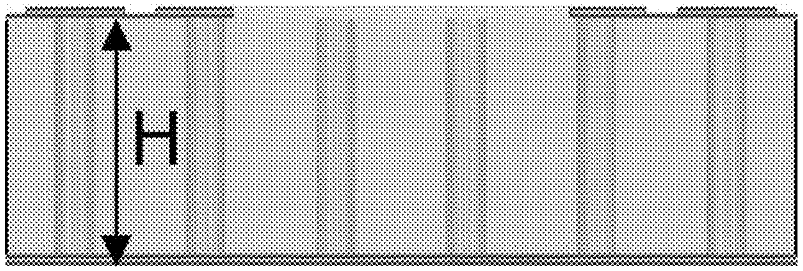
FIG. 20*b* shows a side view of the Ka-band antenna.
Figure 20C:
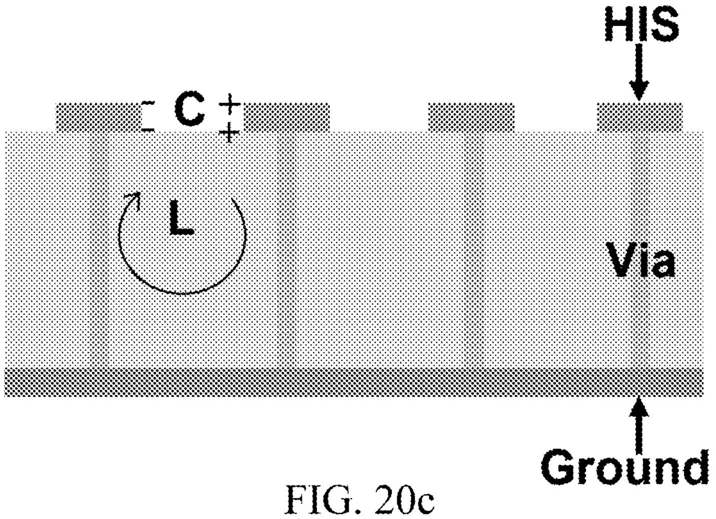
FIG. 20*c* shows inductance and capacitance of the high impedance surface, according to an embodiment of the subject invention.
Figure 21A:
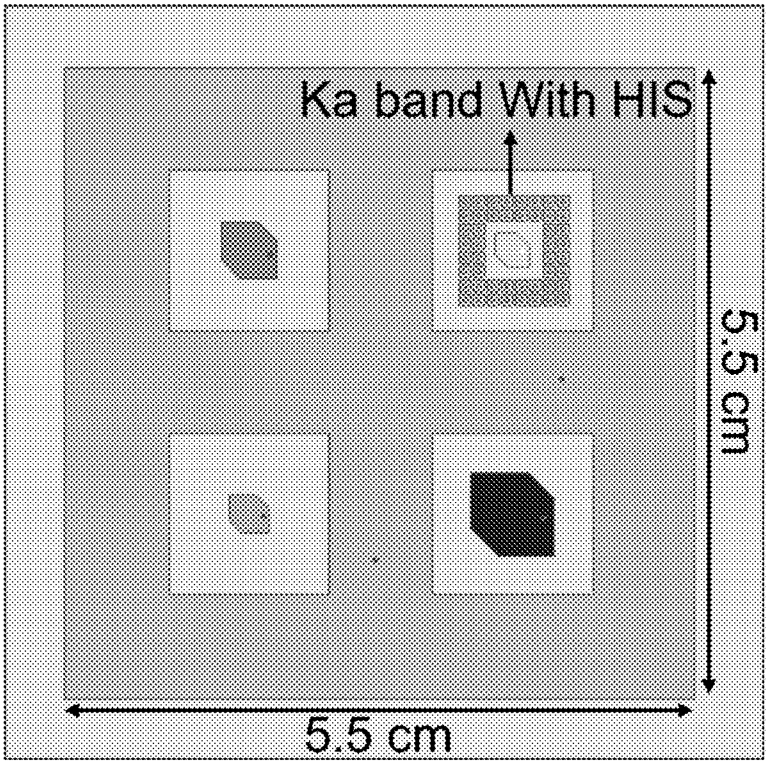
FIG. 21*a* shows the penta-band antenna device with integrated high impedance surface (HIS) at Ka-band.
Figure 21B:
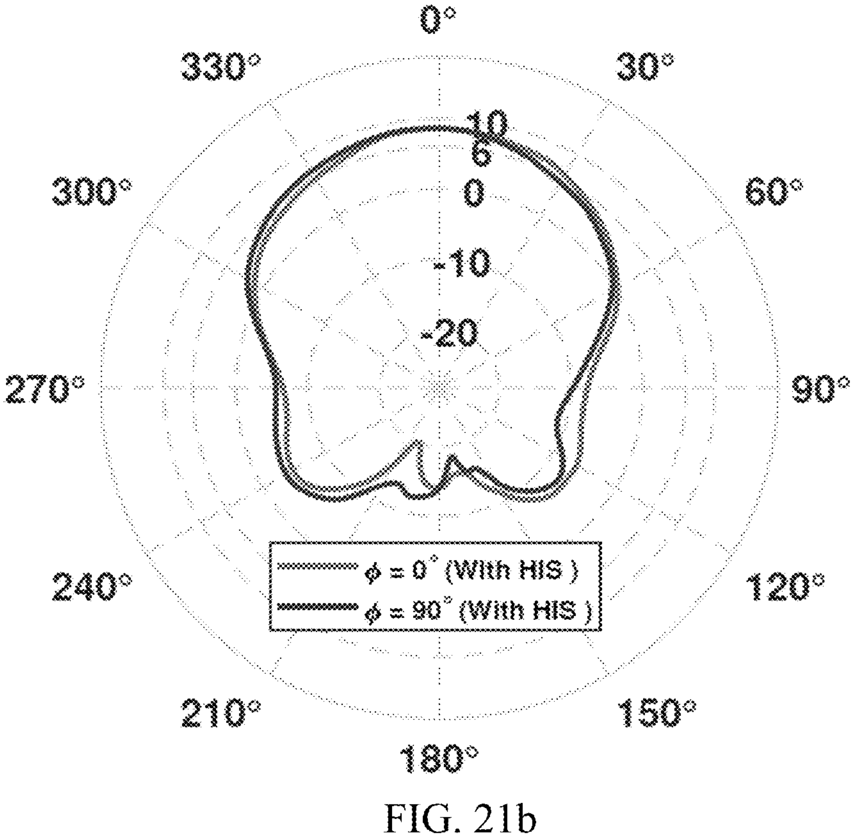
FIG. 21*b* shows the simulation results of the beam pattern at 32 GHz without HIS and with HIS (resulting in a smooth pattern with no ripples), according to an embodiment of the subject invention.

The HIS is a two-dimensional lattice arranged as a mushroom-like structure protruding from the lower ground plane, as shown in FIGS. 21*a* and 21*b*. The top surface is a square-shaped patch arranged in a planar structure. The bottom surface is the ground plane shorted with the top surface using metal vias. Since the HIS is compact compared to the wavelength, it can be modeled as a lumped element of capacitor and inductor, as shown in FIG. 20*c*. The capacitance is formed due to the gap of the top patches, while the inductance is formed due to the loop between the two patches through the metal via connecting the top and bottom ground planes.

The equations for the inductance and capacitance can be written as follows.

$$L=\mu_0 H \tag{1}$$

$$C=\varepsilon_0 p(\varepsilon_r+\varepsilon_0)\cos h^{-1}(d/g)/\pi \tag{2}$$

where, L and C denote the inductance and capacitance of HIS, respectively. $\varepsilon_0$ and $\mu_0$ are the permittivity and permeability of the free space, respectively. $\varepsilon_r$ is the permittivity of substrate ($\varepsilon_r$=2.2). The width of the square patch is p, the center-to-center distance of the adjacent patch is d, g is the gap between two adjacent patches, and H is the height of substrate as shown in FIGS. 21*a* and 21*b*. The resonant frequency (f) and surface impedance (Z) can be written as follows.

$$f=1/2\pi\sqrt{LC} \tag{3}$$

$$Z=j\omega L/(1-j\omega^2 LC) \tag{4}$$

To design the HIS for effective operation at a specified frequency of 32 GHz, the process begins by calculating the inductance L using Equation (1) as discussed above. Since the height of the substrate (H) is fixed, the calculation is straightforward. Next, the capacitance C is determined using Equation (3) by substituting the desired frequency (for example, 32 GHz) and the inductance value obtained in the first step. With the required capacitance known, FIG. 20*a* is used to find and optimize the values of p, d, and g to match the calculated capacitance. Finally, vias are created to connect the HIS with the ground plane, ensuring that the HIS operates effectively at the specified frequency.

Figure 22:
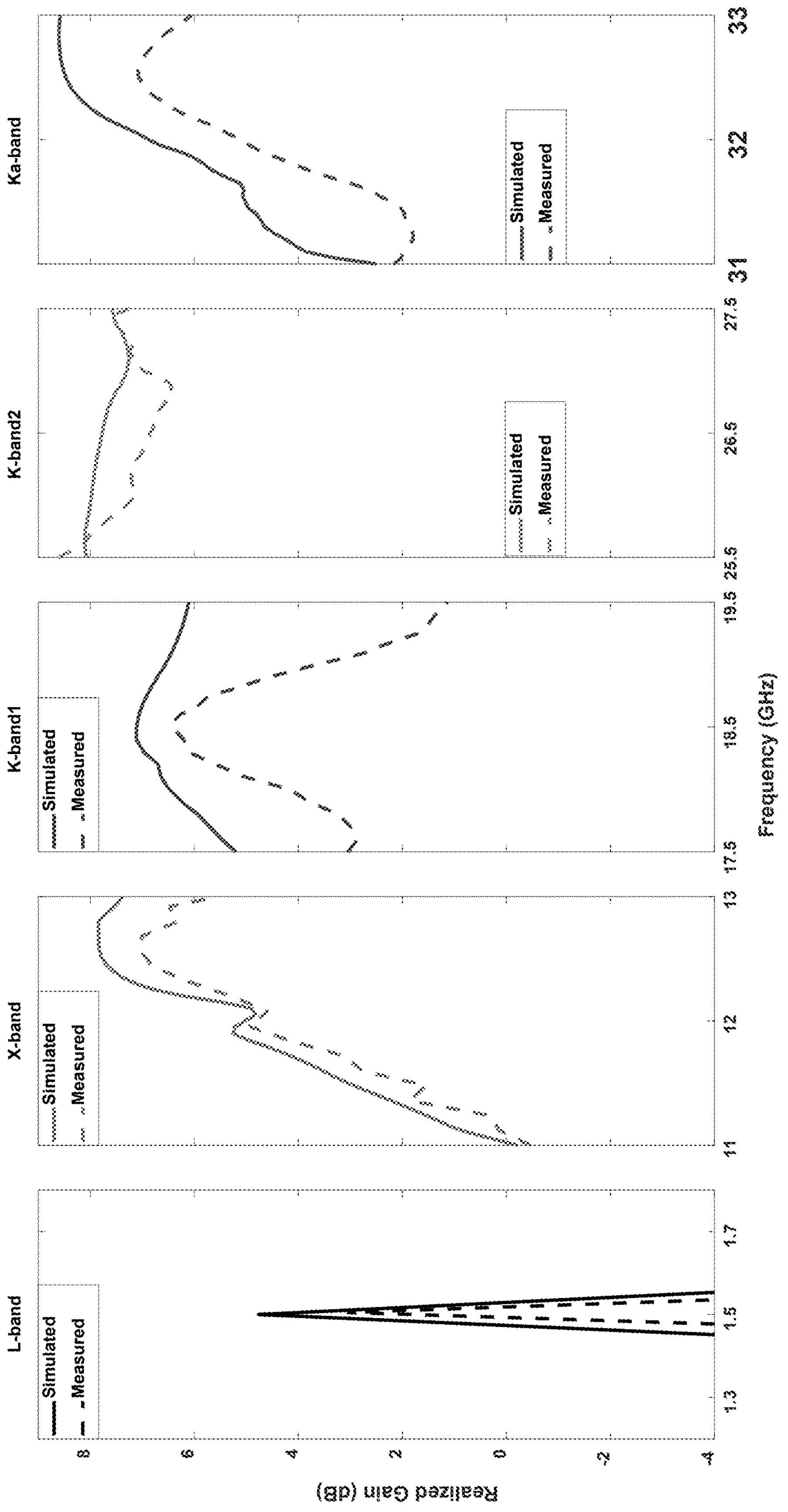
FIG. 22 shows the simulated realized gains at five different frequency bands including the L-band, X-band, K-band1, K-band2, and Ka-band, with and without HIS, according to an embodiment of the subject invention.
Figure 23:
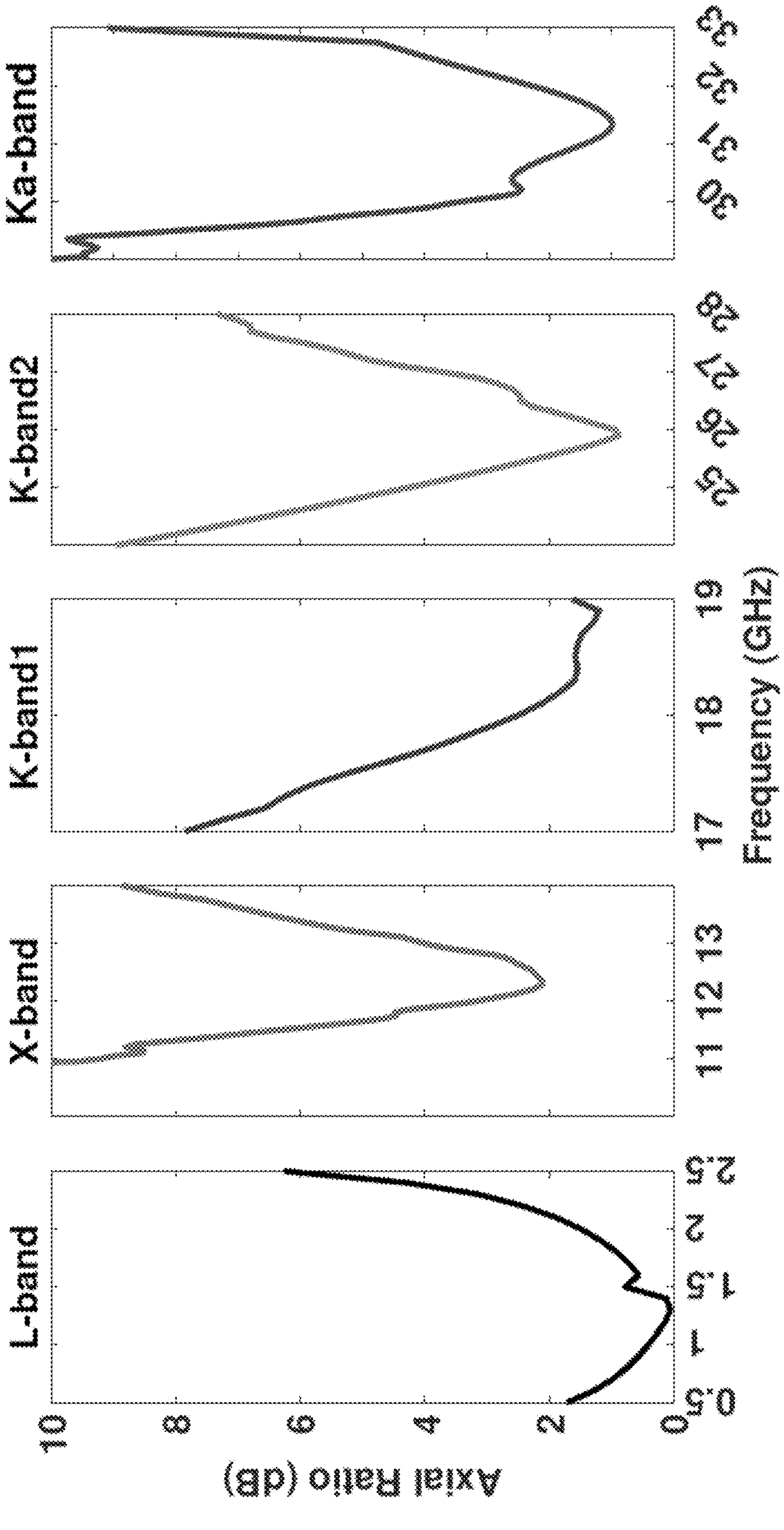
FIG. 23 shows the simulated axial ratios of the L-band, X-band, K-band1, K-band2, and Ka-band of the penta-band antenna device, according to an embodiment of the subject invention.
Figure 24:
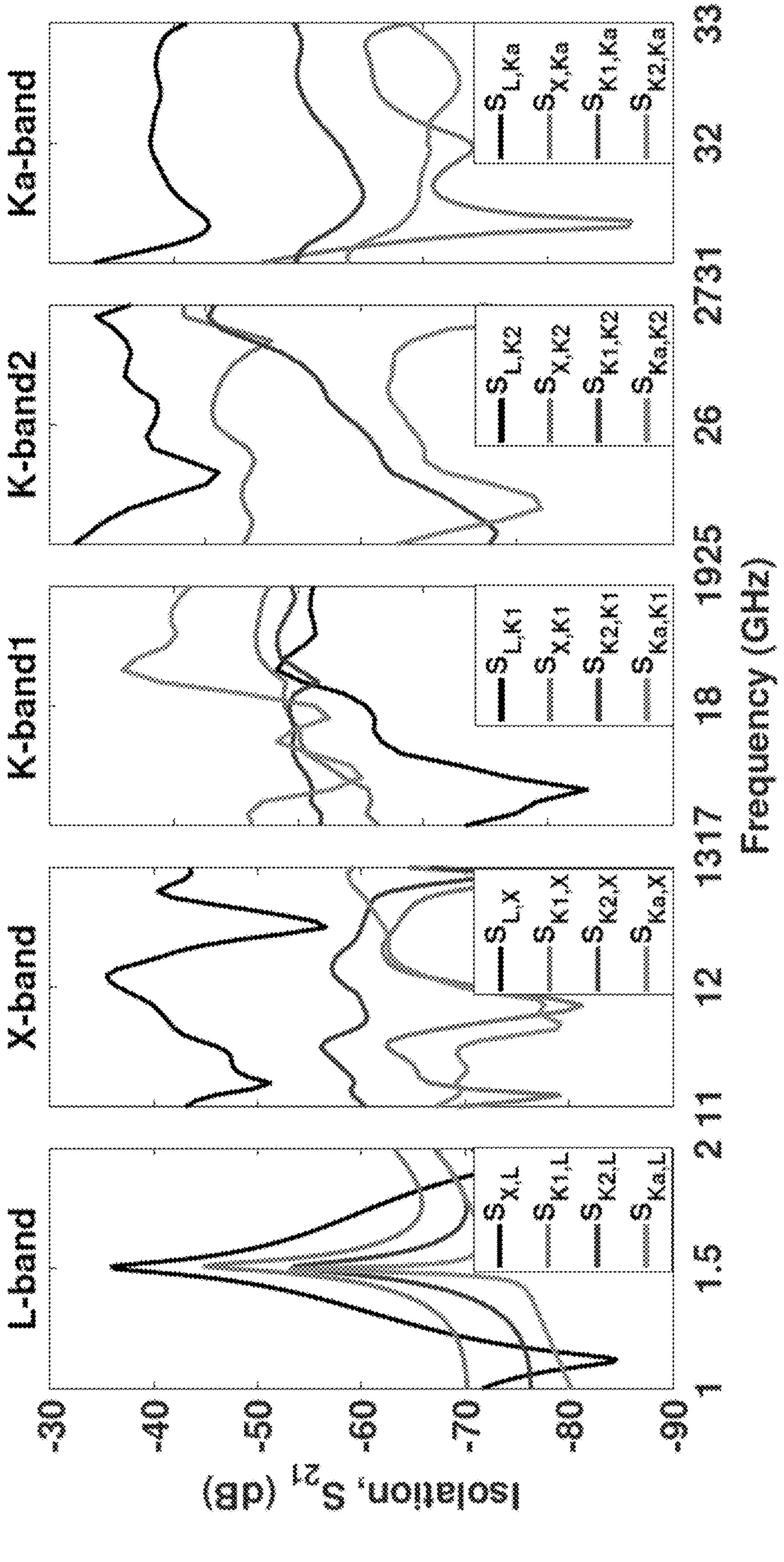
FIG. 24 shows the simulated isolation (greater than 35 dB) among the L-band, X-band, K-band1, K-band2, and Ka-band of the penta-band antenna device, according to an embodiment of the subject invention.

According to the analytical Equations (1) and (2), p, d, and g values are 1 mm, 1.145 mm, and 0.145 mm, respectively. However, in full-wave simulation, the abovementioned variables must be slightly adjusted, with d and g being 1.226 mm and 0.226 mm. The surface inductance and capacitance are calculated as 0.99 nanohenries (nH) and 24.85 femtoFarads (fF). Therefore, the surface impedance can be computed using Equation (3), that is $-4.5\times10^{17}$i. The resonant frequency of the HIS structure is near 32 GHz, calculated using Equation (4). The gap between the patch antenna and HIS is 1 mm (s=1 mm). The integrated structure of HIS for Ka-band (32 GHz) is shown in FIG. 21*a*. The other band antennas are unchanged, and the full wave simulation is performed again. The new radiation pattern for the 32 GHz antenna is shown in FIG. 21*b*. As expected, the ripples of the radiation pattern are removed due to the successful mitigation of surface waves using HIS as compared to FIG. 18*e*. The frequency versus realized gain and the frequency versus axial ratio are shown in FIGS. 22 and 13, respectively. It is noteworthy that the isolation among the antenna elements exceeds 35 dB for the desired frequency band, as shown in FIG. 24.

Fabrication and Assembly

A prototype of the penta-band antenna is fabricated using a stanðard laser machine. An extrusion method uses Ag paste under a microscope to create the HIS around the ka-band (32 GHz) antenna. The SMA connector is used to connect the L-band antenna, whereas an SMPS connector and SMPS to 2.4 mm adapter are used to connect the other four bands antenna. The SMPS is selected for the upper band due to the narrow spacing between the antenna elements.

DISCUSSION

Figure 25:
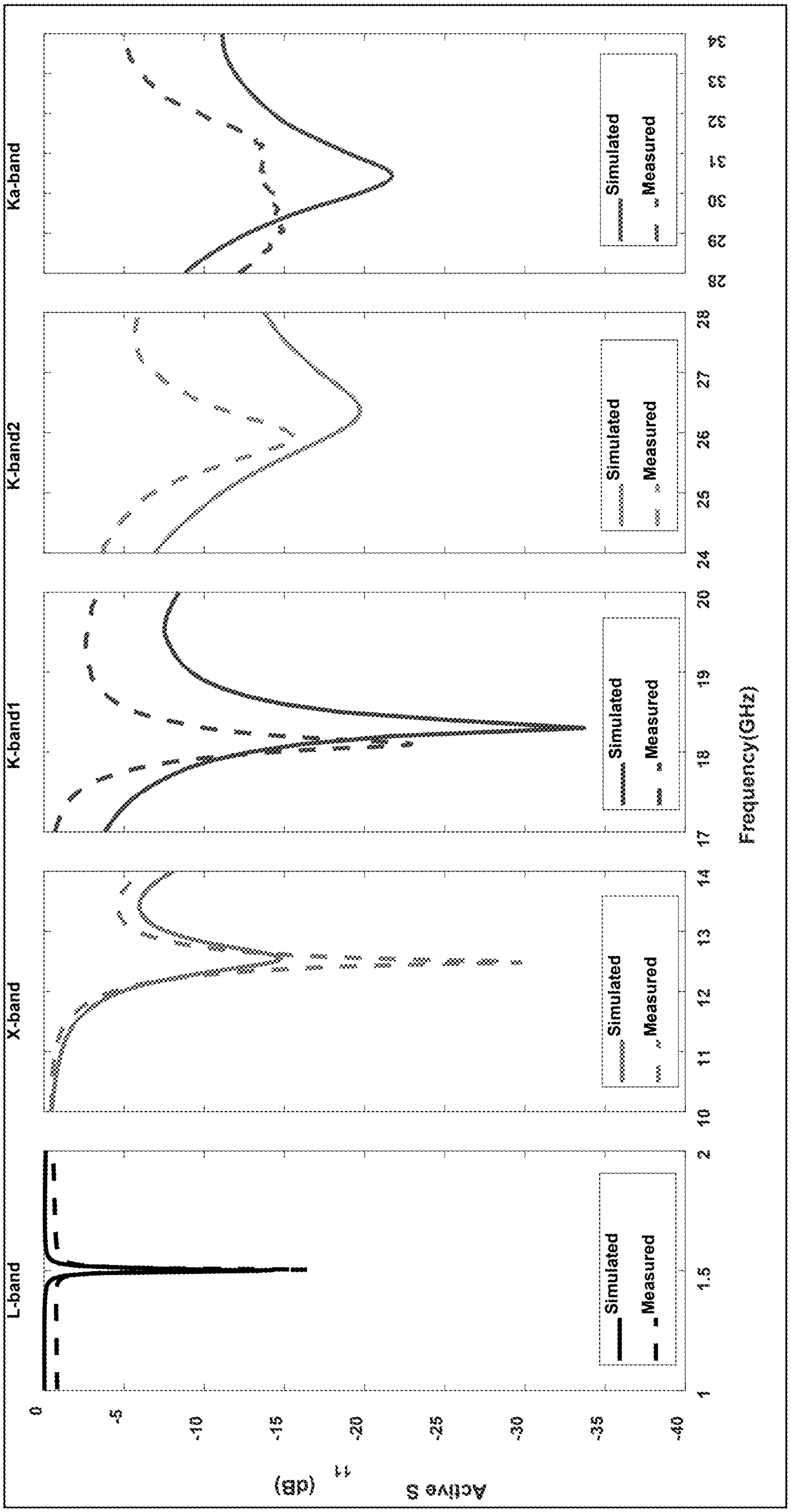
FIG. 25 shows the simulated and measured active $S_{11}$ of the L-band, X-band, K-band1, K-band2, and Ka-band of the penta-band antenna device, according to an embodiment of the subject invention.

The simulated and measured results of Su are shown in FIG. 25. The measured Su perfectly aligns with the L-band and X-band. However, a slight discrepancy exists between simulated and measurement data for K-band1, K-band2, and Ka-band antenna. The slight discrepancy between simulated and measured data is because of fabrication in accuracy. The measured realized gain of L-band, X-band, K-band1, K-band2, and Ka-band antenna are 3.06 dBi, 7.03 dBi, 5.83 dBi, 7.08 dBi, and 7.18 dBi, respectively, as shown in FIGS. 27*a*-27*e*; the simulated realized gains are 5.05 dBi, 8.21 dBi, 7.33 dBi, 7.97 dBi, and 8.56 dBi, respectively. The minor difference between simulated and measured data stems from inaccuracies in fabrication.

Figure 26A:
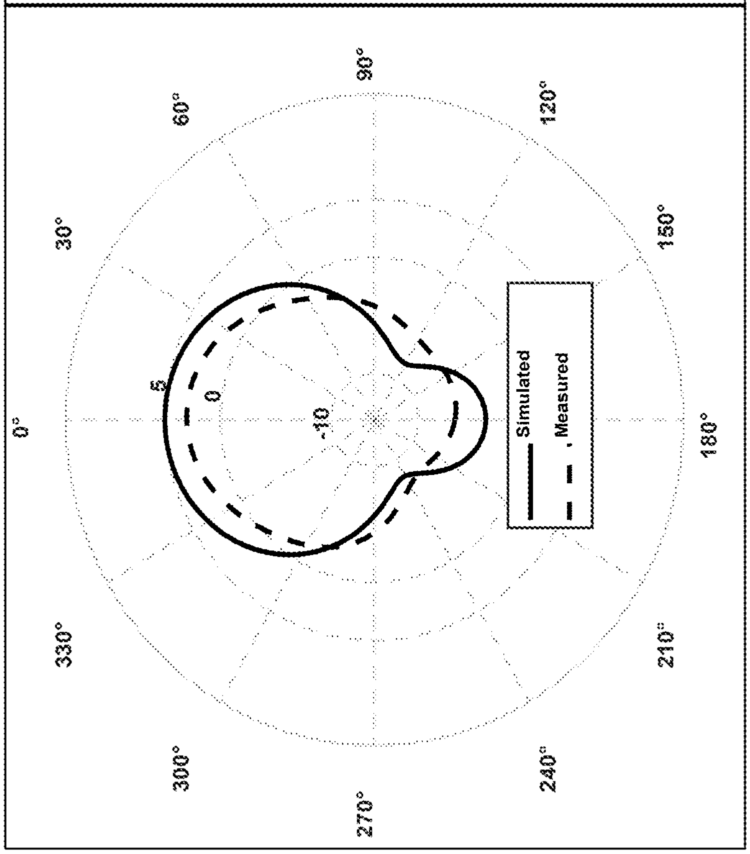
FIGS. 26*a*-26*e* show the simulated and measured realized gains for φ=0° at 1.5 GHz (FIG. 26*a*), 12 GHz (FIG. 26*b*), 18.5 GHz (FIG. 26*c*), 26 GHz (FIG. 26*d*), and 32 GHz (FIG. 26*e*), according to an embodiment of the subject invention.
Figure 26B:
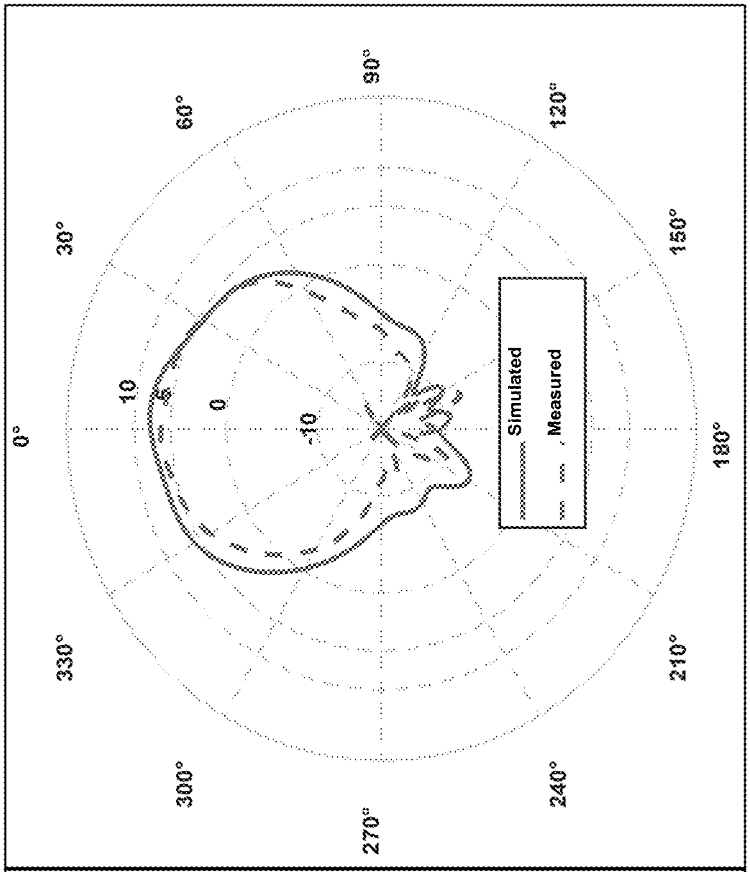
Figure 26C:
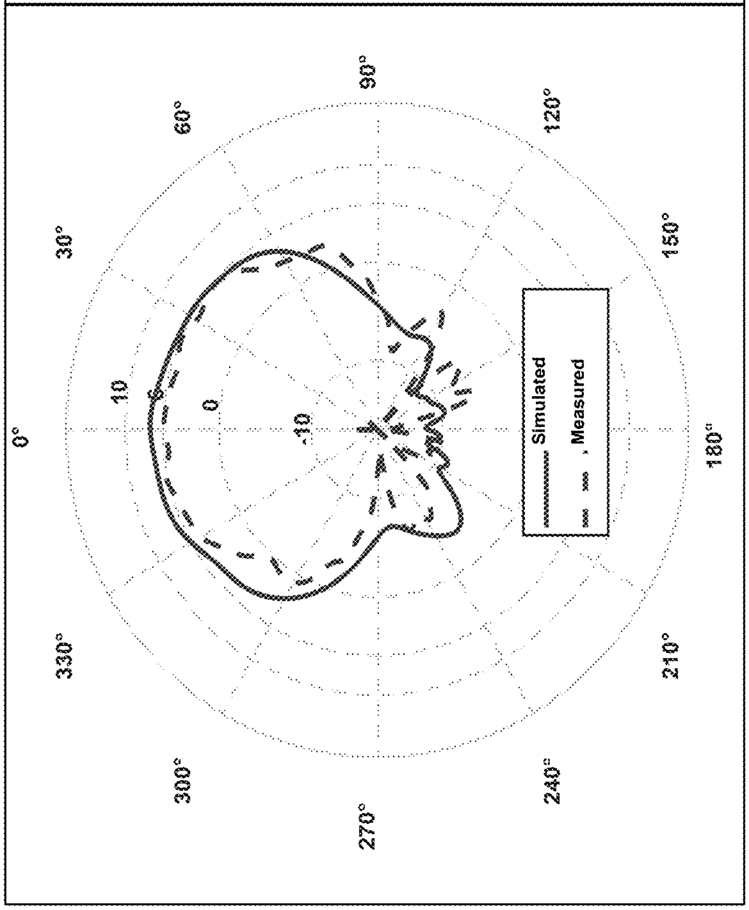
Figure 26D:
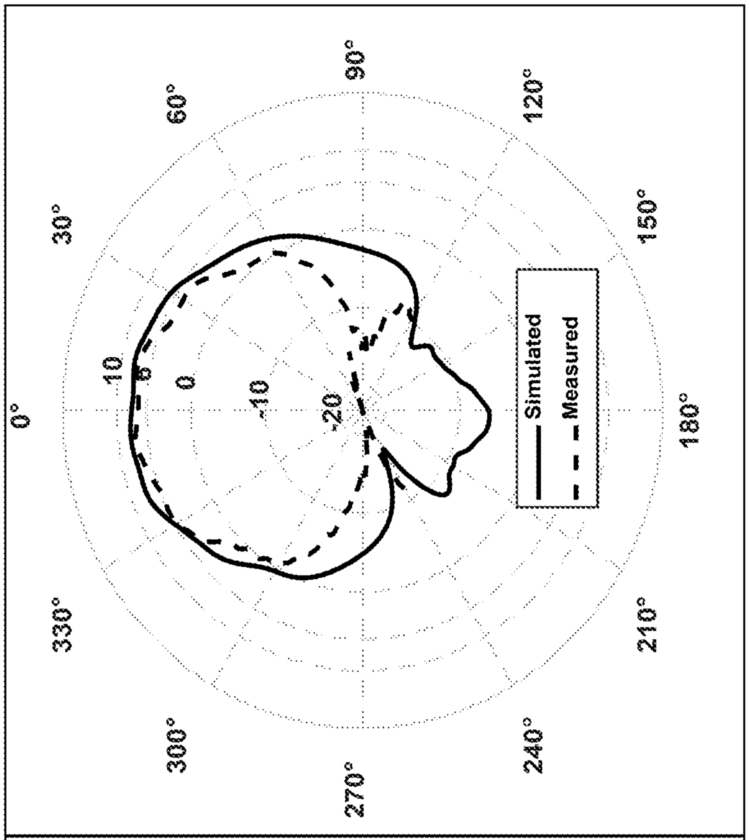
Figure 26E:
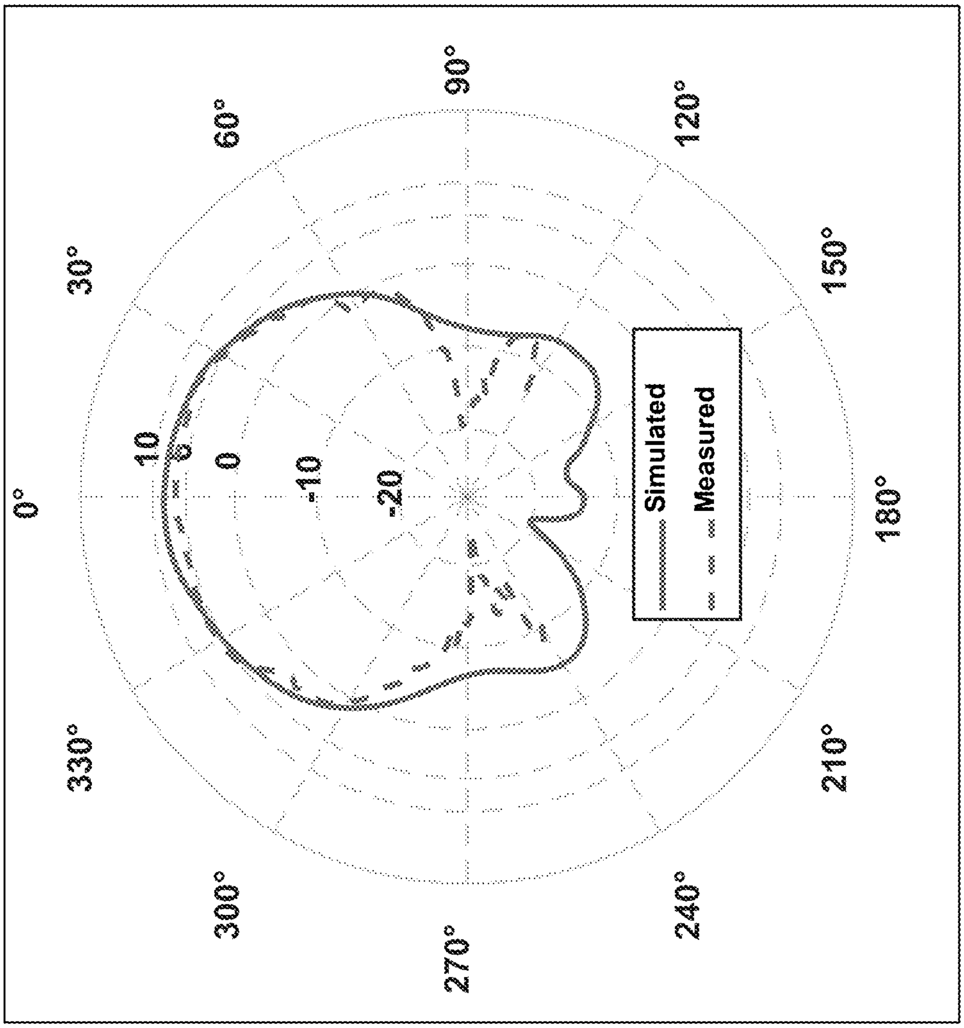
Figure 27:
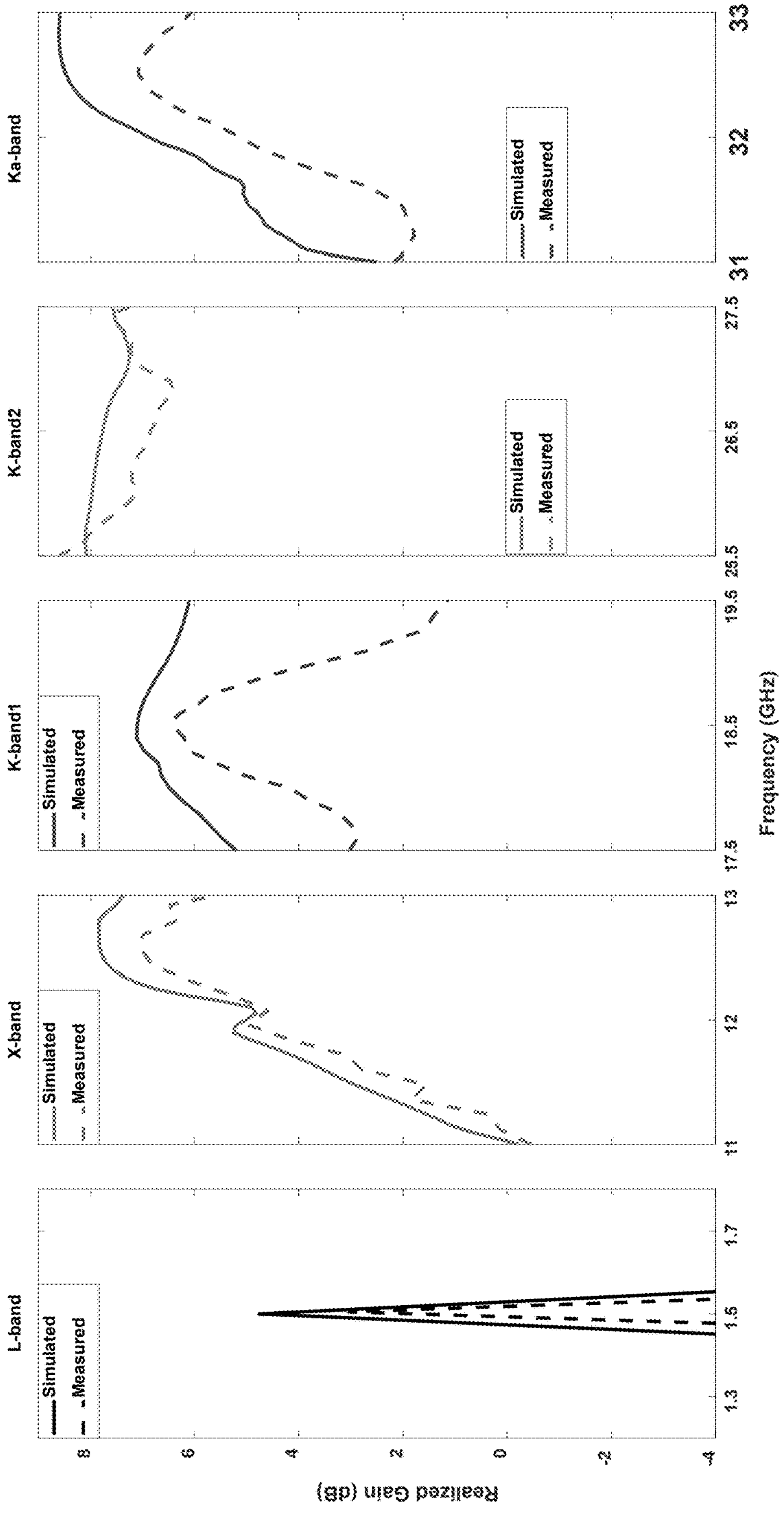
FIG. 27 shows the simulated and measured gains of the L-band, X-band, K-band1, K-band2, and Ka-band of the penta-band antenna device, according to an embodiment of the subject invention.

In contrast, the measured realized gain of the Ka-band antenna with HIS agrees with the simulated result, showing the effectiveness of HIS in suppressing the surface wave and presenting a ripple-free radiation pattern as shown in FIG. 26*e*. FIG. 27 shows the simulated and measured realized gain. The measured gain is slightly lower than the simulated gain, but the realized gain curve pattern shows symmetry. The properties of the conventional antenna and the antenna device of the subject invention are summarized in Table 2. Among them, the antenna device of the subject invention shows a superior frequency ratio with the lowest thickness and high isolation. For instance, the antenna device of the subject invention exhibits a much higher frequency ratio and much lower thickness compared to the conventional dual-band antenna.

The conventional dual-band microstrip patch antenna was designed to cover the S and X bands. The design incorporates two dielectric stacks placed on top of the driven patch to enhance gain by forming a Fabry-Perot Resonator Cavity Antenna (FPRA). However, this approach results in increased antenna thickness (0.1372) and overall volume, posing integration challenges on the side of a 1 U CubeSat due to its stringent maximum weight constraints.

In contrast, the antenna device of the subject invention has a lightweight and compact structure with a low thickness (0.0032), facilitating penta-band operation with a high-frequency ratio (21.3) and isolation (>35 dB). This design ensures smooth operation for 1U CubeSats, and its compact form allows for easy mounting on the side of a 1U CubeSat.

According to the embodiment of the subject invention, a CP penta-band antenna device based on the AIA design is presented for the CubeSat applications. This antenna device comprises five different antenna bands, from L-band to Ka-band. Four different frequency bands, such as 12 GHz, 18.5 GHZ, 26 GHz, and 32 GHz antennas, are incorporated into the L-band antenna, and they can operate simultaneously for CubeSat downlink operation. A quad square-shaped slot is etched in the L-band antenna, and four different band antennas are placed. The antenna shows good realized gain (5-10 dBic) with good CP bandwidth (<3 dB) for the operational frequency range. This shared aperture's maximum to minimum-frequency ratio is around 21, which is very challenging. The Ka-band antenna is incorporated with an HIS to mitigate the ripples in the radiation pattern created by the interference of surface waves. The measurement data agrees well with the simulation, which shows that this antenna can be a great candidate for the multi-frequency operation of the CubeSat antenna.

Method

Full-wave simulation software ANSYS-HFSS is used to design the penta-band antenna device. The design involved incorporating four different bands of antenna into a single L-band antenna, and the calculations of high impedance surface for the Ka-band antenna are carried out using Equations (1), (2), (3), and (4). A prototype is fabricated and tested to validate the full-wave simulation results. The prototype penta-band antenna device is manufactured by a conventional laser machine. To implement the HIS around the Ka-band (32 GHz) antenna, an extrusion technique is employed to create vias using silver (Ag) paste under the guidance of a microscope machine.

According to the embodiments of the subject invention, an AIA antenna device for 3U CubeSats is provided, designed to target five widely spaced frequency bands of the spectrum, namely, L (1.5 GHZ), X (12 GHZ), K (18.5 and 26 GHZ), and Ka (32 GHz) with maximum frequency ratio 21.3. The antenna device comprises a square-shaped L-band antenna with four symmetrically etched quad-gap. The four different band antennas are inserted into this quad-gap of the L-band antenna. These antennas are designed to achieve left-hand circular polarization (LHCP) with corner truncation. Each of the antennas has a separate ground plane to reduce the surface wave and increase the isolation. The L-band antenna has two orthogonal feeding positions to switch the linear polarization to circular polarization when needed. Moreover, the other four bands, X-band operating at 12 GHz, K-band1 operating at 18.5 GHZ, K-band2 operating at 26 GHz, and Ka-band operating at 32 GHz have only single feed and corner perturbation for LHCP. Furthermore, the Ka-band antenna is integrated with a high-impedance surface (HIS) to minimize the surface waves generated by the finite discontinuity of the ground plane.

In an embodiment, a circular polarized penta-band antenna device can comprise: a substrate; a primary L-band antenna formed on the substrate; and a plurality of secondary antennas formed on a top surface of the L-band antenna. The plurality of secondary antennas can comprise: an X-band antenna; a K-band1 antenna; a K-band2 antenna; and a Ka-band antenna. Each of the X-band, K-band1, K-band2, and Ka-band antennas can have a corner-truncated patch structure configured to generate left-hand circular polarization (LHCP); each of the antennas can operate simultaneously to enable multi-band communication; and/or and a shared aperture can be formed across all antennas. The L-band antenna can be configured to operate at approximately 1.5 GHz; the X-band antenna can be configured to operate at approximately 12.5 GHz; the K-band1 antenna can be configured to operate at approximately 18.5 GHz; the K-band2 antenna can be configured to operate at approximately 26 GHz; and/or the Ka-band antenna can be configured to operate at approximately 32 GHz. The plurality of secondary antennas can be integrated into the L-band antenna through a plurality of etched slots of the L-band antenna. The plurality of etched slots of the L-band antenna can be square-shaped to accommodate the secondary antennas. An etched slot of the plurality of etched slots for the Ka-band can have dimensions of approximately 14 mm×14 mm. The Ka-band antenna can further comprise a high impedance surface (HIS) integrated around the patch structures to mitigate surface wave interference and reduce radiation pattern distortions. The substrate can be made of a material having a relative permittivity ($\varepsilon_r$) of approximately 2.2, a loss tangent (tanδ) of approximately 0.009, and/or a thickness of approximately 0.79 mm. The L-band antenna can have a dimension of approximately 5.5 cm×5.5 cm. The L-band antenna can include two orthogonal feeds for achieving circular polarization. Each of the X-band, K-band1, K-band2, and Ka-band antennas can be provided with a dedicated ground plane separated by a gap from a ground plane of the L-band antenna. The antenna device can be configured to achieve an inter-band isolation greater than 35 dB. Each of the ground planes of the secondary antennas can be spaced apart from by a distance of approximately 2 mm. The L-band antenna can be configured to achieve a realized gain of approximately 5.05 dBi in both the E-plane and H-plane when operating at approximately 1.5 GHZ; the X-band antenna can be configured to achieve a realized gain of approximately 7.8 dBi when operating at approximately 12.5 GHz; the K-band1 antenna can be configured to achieve a realized gain of approximately 7.1 dBi when operating at approximately 18.5 GHz; the K-band2 antenna can be configured to achieve a realized gain of approximately 7.97 dBi when operating at approximately 26 GHz; and/or the Ka-band antenna can be configured to achieve a realized gain of approximately 9.97 dBi when operating at approximately 32 GHz. The antenna device can be configured to achieve a circular polarization bandwidth of less than 3 dB. The antenna device can be configured to integrate into form factors of a CubeSat without deployable structures.

In another embodiment, a circularly polarized penta-band antenna device for CubeSat applications can comprise: a primary L-band antenna configured to operate at approximately 1.5 GHZ, the L-band antenna formed on a planar substrate; four etched slots disposed symmetrically within the L-band antenna to form quad-gaps; four patch antennas respectively configured to operate at X-band frequency of approximately 12 GHZ, K-band1 frequency of approximately 18.5 GHZ, K-band2 frequency of approximately 26 GHZ, and Ka-band frequency of approximately 32 GHZ), the four patch antennas being embedded in the quad-gaps of the L-band antenna; and a high-impedance surface (HIS) formed with the Ka-band antenna and configured to mitigate surface wave interference and suppress ripples in the radiation patterns. Each of the X-band, K-band1, K-band2, and Ka-band antennas can be formed with a corner-truncated patch configured to generate left-hand circular polarization (LHCP). The L-band antenna can include two orthogonal feed positions configured to enable switching between linear polarization and circular polarization. Each of the X, K, and Ka-band antennas can comprise a separate ground plane spaced apart from a ground plane of the L-band antenna. The HIS can comprise a 2D periodic structure of square metal patches connected via a plurality of vias to the ground plane of the Ka-band antenna to mitigate surface wave interference and suppress ripples in the radiation patterns. The HIS can be configured to have inductance and capacitance to resonate at approximately 32 GHZ, thereby suppressing surface wave propagation.

In another embodiment, a method of fabricating a circular polarized penta-band antenna device can comprise: providing a substrate; fabricating a primary L-band antenna with dimensions configured to operate at approximately 1.5 GHz; etching four symmetrical slots into the L-band antenna to define quad-gaps; inserting four patch antennas into the four quad-gaps, respectively, each patch antenna being configured to operate at a respective band of X, K1, K2, and Ka; forming each patch antenna with a corner-truncated geometry to achieve left-hand circular polarization; providing a separate ground plane for each patch antenna by etching copper beneath each corresponding slot region; and assembling and connecting each antenna feed, wherein the L-band antenna includes dual orthogonal feeds and each of the X, K1, K2, and Ka antennas includes a single feed. The substrate can be made of a material having a relative permittivity (er) of approximately 2.2, a loss tangent (tanδ) of approximately 0.009, and/or a thickness of approximately 0.79 mm. The method can further comprise integrating a high-impedance surface (HIS) adjacent to the Ka-band patch antenna to suppress surface wave propagation and smooth the radiation pattern. The HIS can be formed with a mushroom-type structure with top patches and a plurality of metal vias, being equivalent to a lumped LC circuit resonant at approximately 32 GHz. The fabricated antenna can be validated through full-wave simulation and measurement of realized gain and axial ratio across the five bands including L, X, K1, K2, and Ka.

When ranges are used herein, combinations and subcombinations of ranges (e.g., any subrange within the disclosed range) and specific embodiments therein are intended to be explicitly included. When the term “about” or “approximately” is used herein, in conjunction with a numerical value, it is understood that the value can be in a range of 95% of the value to 105% of the value, i.e. the value can be +/−5% of the stated value. For example, “about 1 kg” means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A circular polarized penta-band antenna device, comprising:

a substrate;

a primary L-band antenna formed on the substrate; and a plurality of secondary antennas formed on a top surface of the L-band antenna, the plurality of secondary antennas comprising:

an X-band antenna;

a K-band1 antenna;

a K-band2 antenna; and a Ka-band antenna;

each of the X-band, K-band1, K-band2, and Ka-band antennas having a corner-truncated patch structure configured to generate left-hand circular polarization (LHCP), each of the antennas being configured to operate simultaneously to enable multi-band communication, and a shared aperture being formed across all antennas.

2. The antenna device according to claim 1, the L-band antenna being configured to operate at approximately 1.5 GHz.

3. The antenna device according to claim 1, the X-band antenna being configured to operate at approximately 12.5 GHz.

4. The antenna device according to claim 1, the K-band1 antenna being configured to operate at approximately 18.5 GHz.

5. The antenna device according to claim 1, the K-band2 antenna being configured to operate at approximately 26 GHz.

6. The antenna device according to claim 1, the Ka-band antenna being configured to operate at approximately 32 GHz.

7. The antenna device according to claim 1, the plurality of secondary antennas being integrated into the L-band antenna through a plurality of etched slots of the L-band antenna.

8. The antenna device according to claim 7, the plurality of etched slots of the L-band antenna being square-shaped to accommodate the secondary antennas.

9. The antenna device according to claim 1, the Ka-band antenna further comprising a high impedance surface (HIS) integrated around the patch structures to mitigate surface wave interference and reduce radiation pattern distortions.

10. The antenna device according to claim 1, the substrate being made of a material having a relative permittivity (εr) of approximately 2.2, a loss tangent (tanδ) of approximately 0.009, and a thickness of approximately 0.79 mm.

11. The antenna device according to claim 1, the L-band antenna including two orthogonal feeds for achieving circular polarization.

12. The antenna device according to claim 1, each of the X-band, K-band1, K-band2, and Ka-band antennas being provided with a dedicated ground plane separated by a gap from a ground plane of the L-band antenna.

13. The antenna device according to claim 1, the antenna device being configured to achieve an inter-band isolation greater than 35 dB.

14. A method of fabricating a circular polarized penta-band antenna device, the method comprising:

providing a substrate;

fabricating a primary L-band antenna with dimensions configured to operate at approximately 1.5 GHz;

etching four symmetrical slots into the L-band antenna to define quad-gaps;

inserting four patch antennas into the four quad-gaps, respectively, each patch antenna being configured to operate at a respective band of X, K1, K2, and Ka;

forming each patch antenna with a corner-truncated geometry to achieve left-hand circular polarization;

providing a separate ground plane for each patch antenna by etching copper beneath each corresponding slot region; and assembling and connecting each antenna feed, wherein the L-band antenna includes dual orthogonal feeds and each of the X, K1, K2, and Ka antennas includes a single feed.

15. The method according to claim 14, the substrate being made of a material having a relative permittivity (εr) of approximately 2.2, a loss tangent (tanδ) of approximately 0.009, and a thickness of approximately 0.79 mm.

16. The method according to claim 14, further comprising integrating a high-impedance surface (HIS) adjacent to the Ka-band patch antenna to suppress surface wave propagation and smooth the radiation pattern.

17. The method according to claim 16, the HIS being formed with a mushroom-type structure with top patches and a plurality of metal vias, being equivalent to a lumped LC circuit resonant at approximately 32 GHz.

18. A circularly polarized penta-band antenna device for CubeSat applications, comprising:

a primary L-band antenna configured to operate at approximately 1.5 GHZ, the L-band antenna formed on a planar substrate;

four etched slots disposed symmetrically within the L-band antenna to form quad-gaps;

four patch antennas respectively configured to operate at X-band frequency of approximately 12 GHz, K-band1 frequency of approximately 18.5 GHZ, K-band2 frequency of approximately 26 GHz, and Ka-band frequency of approximately 32 GHz), the four patch antennas being embedded in the quad-gaps of the L-band antenna; and a high-impedance surface (HIS) formed with the Ka-band antenna and configured to mitigate surface wave interference and suppress ripples in the radiation patterns;

each of the X-band, K-band1, K-band2, and Ka-band antennas being formed with a corner-truncated patch configured to generate left-hand circular polarization (LHCP), the L-band antenna including two orthogonal feed positions configured to enable switching between linear polarization and circular polarization, and each of the X, K, and Ka-band antennas comprising a separate ground plane spaced apart from a ground plane of the L-band antenna.

19. The antenna device according to claim 18, the HIS comprising a 2D periodic structure of square metal patches connected via a plurality of vias to the ground plane of the Ka-band antenna to mitigate surface wave interference and suppress ripples in the radiation patterns.

20. The antenna device according to claim 18, the HIS being configured to have inductance and capacitance to resonate at approximately 32 GHz, thereby suppressing surface wave propagation.

* * * * *